(12) United States Patent
Atienza et al.

(10) Patent No.: US 11,066,494 B2
(45) Date of Patent: Jul. 20, 2021

(54) AMINE BRIDGED ANILIDE PHENOLATE CATALYST COMPOUNDS

(71) Applicant: ExxonMobil Chemical Patents Inc., Baytown, TX (US)

(72) Inventors: Crisita Carmen H. Atienza, Houston, TX (US); David A. Cano, Houston, TX (US); Catherine A. Faler, Houston, TX (US); Margaret T. Whalley, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 16/575,780

(22) Filed: Sep. 19, 2019

(65) Prior Publication Data
US 2020/0095349 A1 Mar. 26, 2020

Related U.S. Application Data

(60) Provisional application No. 62/734,004, filed on Sep. 20, 2018.

(51) Int. Cl.
| *C08F 4/64* | (2006.01) |
| *C08F 4/76* | (2006.01) |
| *C07F 7/00* | (2006.01) |
| *C08F 210/16* | (2006.01) |
| *C08F 10/02* | (2006.01) |
| *C07F 5/00* | (2006.01) |

(52) U.S. Cl.
CPC ............. *C08F 10/02* (2013.01); *C07F 5/00* (2013.01); *C08F 4/64151* (2013.01); *C07F 7/00* (2013.01); *C08F 4/76* (2013.01); *C08F 210/16* (2013.01)

(58) Field of Classification Search
CPC ..... C08F 4/64151; C08F 10/02; C08F 210/16
See application file for complete search history.

(56) References Cited

U.S. PATENT DOCUMENTS

| 7,045,583 | B2 * | 5/2006 | Kuchta | ............... C07F 7/00 526/172 |
| 7,074,870 | B2 | 7/2006 | Brummer et al. | |
| 7,259,219 | B2 | 8/2007 | Rosen et al. | |
| 7,317,057 | B2 | 1/2008 | Solan et al. | |
| 7,767,773 | B2 | 8/2010 | Giesbrecht et al. | |
| 9,233,996 | B2 | 1/2016 | Radlauer et al. | |
| 9,260,552 | B2 | 2/2016 | Hagadorn et al. | |
| 9,527,940 | B2 | 12/2016 | Demirors et al. | |
| 9,527,941 | B2 | 12/2016 | Demirors et al. | |
| 9,751,998 | B2 | 9/2017 | Klosin et al. | |
| 2005/0137367 | A1 | 6/2005 | Kuchta et al. | |
| 2015/0337062 | A1 | 11/2015 | Demirors et al. | |
| 2015/0344601 | A1 | 12/2015 | Demirors et al. | |
| 2018/0030167 | A1 | 2/2018 | Atienza et al. | |

FOREIGN PATENT DOCUMENTS

WO 2014/139861 9/2014

OTHER PUBLICATIONS

Liang et al., J. Am. Chem. Soc. 1999, v.121, pp. 5797-5798.
Chen et al. J. Am. Chem. Soc. 2017, v.139(17), pp. 6034-6037.
Yuan, et al. J. Am. Chem. Soc. 2015, v.137(9), pp. 3177-3180.
Wang et al. J. Organomet. Chem. 2010, v.695(10-11), pp. 1583-1591.

* cited by examiner

Primary Examiner — Rip A Lee

(57) ABSTRACT

The present disclosure provides catalyst compounds having an amine bridged anilide phenolate ligand. In at least one embodiment, catalysts of the present disclosure provide catalyst activity values of about 90 gP/mmolCat·h$^{-1}$ or greater and polyolefins, such as polyethylene copolymers, having comonomer content of from about 4 wt % to about 12 wt %, an Mn of about 90,000 g/mol or more, an Mw of 155,000 g/mol or more, and an Mw/Mn of from 1 to 2.5.

29 Claims, No Drawings

AMINE BRIDGED ANILIDE PHENOLATE CATALYST COMPOUNDS

CROSS REFERENCE TO RELATED APPLICATIONS

This application claims priority to and benefit of Provisional Application No. 62/734,004 filed Sep. 20, 2018, the disclosure of which is incorporated herein by reference.

FIELD

The present disclosure provides catalyst compounds including an amine bridged anilide phenolate, catalyst systems including a catalyst compound, and uses thereof.

BACKGROUND

Olefin polymerization catalysts are of great use in industry and polyolefins are widely used commercially because of their robust physical properties. Hence, there is interest in finding new catalyst systems that increase the utility/efficiency of the catalyst and facilitate the production of polymers having improved properties.

Low density polyethylene is generally prepared at high pressure using free radical initiators, or in gas phase processes using Ziegler-Natta or vanadium catalysts. Suitable low density polyethylene has a density in the range of 0.916 g/cm$^3$ to 0.940 g/cm$^3$. Suitable low density polyethylene produced using free radical initiators is known in the industry as "LDPE". LDPE is also known as "branched" or "heterogeneously branched" polyethylene because of the relatively large number of long chain branches extending from the main polymer backbone. Polyethylene in the same density range, e.g., 0.916 g/cm$^3$ to 0.940 g/cm$^3$, which is linear and does not contain long chain branching, is known as "linear low density polyethylene" ("LLDPE") and can be produced by conventional Ziegler-Natta catalysts or with metallocene catalysts. "Linear" means that the polyethylene has few, if any, long chain branches, and typically exhibits a g'$_{vis}$ value of 0.97 or above, such as 0.98 or above. Polyethylenes having still greater density are the high density polyethylenes ("HDPEs"), e.g., polyethylenes having densities greater than 0.940 g/cm$^3$, and are generally prepared with Ziegler-Natta catalysts or chrome catalysts. Very low density polyethylenes ("VLDPEs") can be produced by a number of different processes yielding polyethylenes having a density less than 0.916 g/cm$^3$, such as 0.890 g/cm$^3$ to 0.915 g/cm$^3$ or 0.900 g/cm$^3$ to 0.915 g/cm$^3$.

Useful polyolefins, such as polyethylene, may have a comonomer, such as hexene, incorporated into the polyethylene backbone. These copolymers provide varying physical properties compared to polyethylene alone and can be produced in a low pressure reactor, utilizing, for example, solution, slurry, or gas phase polymerization processes. Polymerization may take place in the presence of catalyst systems such as those employing a Ziegler-Natta catalyst, a chromium based catalyst, or a metallocene. The comonomer content of a polyolefin (e.g., wt % of comonomer incorporated into a polyolefin backbone) influences the properties of the polyolefin (and composition of the copolymers) and is influenced by the polymerization catalyst.

A copolymer composition, such as a resin, has a composition distribution, which refers to the distribution of comonomer that forms short chain branches along the copolymer backbone. When the amount of short chain branches varies among the copolymer molecules, the composition is said to have a "broad" composition distribution. When the amount of comonomer per 1,000 carbons is similar among the copolymer molecules of different chain lengths, the composition distribution is said to be "narrow".

Like comonomer content, the composition distribution influences the properties of a copolymer composition, for example, stiffness, toughness, environmental stress crack resistance, and heat sealing, among other properties. The composition distribution of a polyolefin composition may be readily measured by, for example, Temperature Rising Elution Fractionation (TREF) or Crystallization Analysis Fractionation (CRYSTAF).

Also, like comonomer content, a composition distribution of a copolymer composition is influenced by the identity of the catalyst used to form the polyolefins of the composition. Ziegler-Natta catalysts and chromium based catalysts generally produce compositions with broad composition distributions, whereas metallocene catalysts typically produce compositions with narrow composition distributions.

Nonetheless, polyolefin compositions formed by catalysts capable of forming high molecular weight polyolefins also often have broad molecular weight distributions, as indicated by high polydispersity indices, and/or higher molecular weight (e.g., Mw of 1,500,000 g/mol or more) and thus often have processing difficulties due to hardness. Furthermore, catalysts capable of forming high molecular weight polyolefins can have low activity (e.g., amount of desirable polymer produced per a period of time).

There is a need for catalysts having high activity and capable of forming polyolefins, for example, with high molecular weight and narrow molecular weight distributions.

References of interest include: Liang, L.; et al. *J. Am. Chem. Soc.* 1999, 121, 5797-5798; US 2005/137367; US 2015/344601; US 2015/337062; WO 2014/139861; U.S. Pat. Nos. 9,751,998; 9,527,940; 9,527,941; 9,233,996; 7,767,773; 7,317,057; 7,045,583; 7,259,219; 7,074,870; Chen et al. *J. Am. Chem. Soc.* 2017, 139(17), 6034-6037; Yuan, et al. *J. Am. Chem. Soc.* 2015, 137(9), 3177-3180; Wang et al. *J. Organomet. Chem.* 2010, 695 (10-11), 1583-1591.

SUMMARY

This invention relates to catalyst compounds represented by Formula (I):

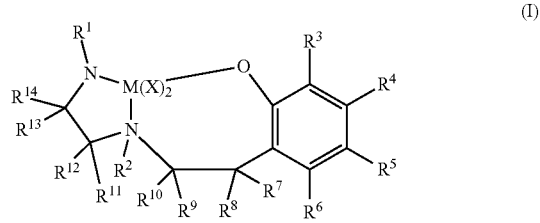

wherein:
M is a group 4 metal;
R$^1$ is an aromatic group or substituted aromatic group;
each of R$^2$, R$^3$, R$^4$, R$^5$, R$^6$, R$^7$, R$^8$, R$^9$, R$^{10}$, R$^{11}$, R$^{12}$, R$^{13}$, and R$^{14}$ is independently hydrogen, C$_1$-C$_{40}$ hydrocarbyl, C$_1$-C$_{40}$ substituted hydrocarbyl, a heteroatom or a heteroatom-containing group, or two or more of R$^1$, R$^2$, R$^3$, R$^4$, R$^5$, $R^6$, $R^7$, $R^8$, $R^9$, $R^{10}$, $R^{11}$, $R^{12}$, $R^{13}$, and $R^{14}$ are joined together to form a $C_4$-$C_{62}$ cyclic or polycyclic ring structure, or a combination thereof;

each X is independently $C_1$-$C_{20}$ hydrocarbyl, $C_1$-$C_{20}$ substituted hydrocarbyl, a heteroatom or a heteroatom-containing group, or two or more X groups join together to form a $C_4$-$C_{62}$ cyclic or polycyclic ring structure.

In yet another embodiment, the present disclosure provides a catalyst system including an activator and a catalyst of the present disclosure.

In yet another embodiment, the present disclosure provides a catalyst system including an activator, a catalyst support, and a catalyst of the present disclosure.

In still another embodiment, the present disclosure provides a polymerization process including a) contacting one or more olefin monomers with a catalyst system including: i) an activator and ii) a catalyst of the present disclosure.

In still another embodiment, the present disclosure provides a polyolefin formed by a catalyst system and/or method of the present disclosure.

DETAILED DESCRIPTION

The present disclosure provides catalyst compounds including an amine bridged anilide phenolate, catalyst systems including a catalyst compound, and uses thereof. In at least one embodiment, the present disclosure is directed to catalyst compounds, catalyst systems, and their use in polymerization processes to produce polyolefin polymers, such as polyethylene polymers and polypropylene polymers. Catalyst compounds of the present disclosure can be zirconium or hafnium-containing compounds having one or more benzyl ligand(s) substituted and linked with an amine bridged anilide phenolate. In another class of embodiments, the present disclosure is directed to polymerization processes to produce polyolefin polymers from catalyst systems including one or more olefin polymerization catalysts, at least one activator, and an optional support.

For example, the present disclosure is directed to a polymerization process to produce a polyethylene polymer, the process including contacting a catalyst system including one or more catalyst compounds, at least one activator, and at least one support, with ethylene and one or more $C_3$-$C_{10}$ alpha-olefin comonomers under polymerization conditions.

Catalysts, catalyst systems, and processes of the present disclosure can provide one or more of: polyolefins at high activity values (e.g., 90 gP/mmolCat·h$^{-1}$ or greater), an Mn of about 70,000 g/mol to about 500,000 g/mol, an Mw of from about 100,000 g/mol to about 750,000 g/mol, and a narrow Mw/Mn of from 1 to 2.5. Catalysts, catalyst systems, and processes of the present disclosure can provide polymers having a comonomer content of from 3 wt % to 9 wt %, such as from 4.5 wt % to 7.5 wt %.

For the purposes of the present disclosure, the numbering scheme for the Periodic Table Groups is used as described in *Chemical And Engineering News*, v.63(5), pg. 27 (1985). Therefore, a "group 4 metal" is an element from group 4 of the Periodic Table, e.g., Hf, Ti, or Zr.

The specification describes transition metal complexes. The term complex is used to describe molecules in which an ancillary ligand is coordinated to a central transition metal atom. The ligand is bulky and stably bonded to the transition metal so as to maintain its influence during use of the catalyst, such as polymerization. The ligand may be coordinated to the transition metal by covalent bond and/or electron donation coordination or intermediate bonds. The transition metal complexes are generally subjected to activation to perform their polymerization or oligomerization function using an activator which, without being bound by theory, is believed to create a cation as a result of the removal of an anionic group, often referred to as a leaving group, from the transition metal.

As used herein, "olefin polymerization catalyst(s)" refers to any catalyst, such as an organometallic complex or compound that is capable of coordination polymerization addition where successive monomers are added in a monomer chain at the organometallic active center.

The terms "substituent," "radical," "group," and "moiety" may be used interchangeably.

As used herein, and unless otherwise specified, the term "$C_n$" means hydrocarbon(s) having n carbon atom(s) per molecule, wherein n is a positive integer.

As used herein, and unless otherwise specified, the term "hydrocarbon" means a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different values of n.

"Conversion" is the amount of monomer that is converted to polymer product, and is reported as mol % and is calculated based on the polymer yield and the amount of monomer fed into the reactor. Catalyst activity is a measure of how active the catalyst is and is reported as the mass of product polymer (P) produced per mole of catalyst (cat) used per hour (kgP·molcat$^{-1}$·h$^{-1}$).

An "olefin," alternatively referred to as "alkene," is a linear, branched, or cyclic compound of carbon and hydrogen having at least one double bond. For purposes of this specification and the claims appended thereto, when a polymer or copolymer is referred to as including an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. Accordingly, the definition of copolymer, as used herein, includes terpolymers and the like. "Different" is used to refer to mer units indicates that the mer units differ from each other by at least one atom or are different isomerically. An "ethylene polymer" or "ethylene copolymer" is a polymer or copolymer including at least 50 mol % ethylene derived units, a "propylene polymer" or "propylene copolymer" is a polymer or copolymer including at least 50 mol % propylene derived units, and so on.

Unless otherwise indicated, as used herein, "low comonomer content" is defined as a polyolefin having less than 8 wt % of comonomer based upon the total weight of the polyolefin. As used herein, "high comonomer content" is defined as a polyolefin having greater than or equal to 8 wt % of comonomer based upon the total weight of the polyolefin.

For the purposes of the present disclosure, ethylene shall be considered an α-olefin.

As used herein, Mn is number average molecular weight, Mw is weight average molecular weight, and Mz is z average molecular weight, wt % is weight percent, and mol % is mole percent. Molecular weight distribution (MWD), also referred to as polydispersity index (PDI), is defined to be Mw divided by Mn. Unless otherwise noted, all molecular weight units (e.g., Mw, Mn, Mz) are g/mol.

Unless otherwise indicated, as used herein, "high molecular weight" is defined as a number average molecular weight (Mn) value of 100,000 g/mol or more. "Low molecular weight" is defined as an Mn value of less than 100,000 g/mol.

Unless otherwise noted all melting points (Tm) are differential scanning calorimetry (DSC) second melt.

The following abbreviations may be used herein: Me is methyl, Ph is phenyl, Et is ethyl, Pr is propyl, iPr is isopropyl, n-Pr is normal propyl, Bu is butyl, cPR is cyclopropyl, iBu is isobutyl, tBu is tertiary butyl, o- is ortho, m- is meta, p- is para, nBu is normal butyl, sBu is sec-butyl, TNOAL is tri(n-octyl)aluminum, MAO is methylalumoxane, Ph is phenyl, Bn is benzyl (i.e., $CH_2Ph$), Cbz is Carbazole, RT is room temperature, and Cy is cyclohexyl.

A "catalyst system" includes at least one catalyst compound and at least one activator. A catalyst system may optionally further include a co-activator and or an optional support material. When "catalyst system" is used to describe the catalyst compound/activator combination before activation, it means the unactivated catalyst complex (precatalyst) together with an activator and, optionally, a co-activator. When it is used to describe the combination after activation, it means the activated complex and the activator or other charge-balancing moiety. The transition metal compound may be neutral as in a precatalyst, or a charged species with a counter ion as in an activated catalyst system. For the purposes of the present disclosure, when catalyst systems are described as including neutral stable forms of the components, it is well understood by one of ordinary skill in the art, that the ionic form of the component is the form that reacts with the monomers to produce polymers. Furthermore, catalyst compounds represented by formulae herein embrace both neutral and ionic forms of the catalyst compounds.

In the description herein, the catalyst may be described as a catalyst precursor, a pre-catalyst compound, catalyst compound or a transition metal compound, and these terms are used interchangeably. A polymerization catalyst system is a catalyst system that can polymerize monomers to polymer. An "anionic ligand" is a negatively charged ligand which donates one or more pairs of electrons to a metal ion. A "neutral donor ligand" is a neutrally charged ligand which donates one or more pairs of electrons to a metal ion. Activator and cocatalyst are also used interchangeably.

A scavenger is a compound that may be added to facilitate polymerization by scavenging impurities. Some scavengers may also act as activators and may be referred to as co-activators. A co-activator, that is not a scavenger, may also be used in conjunction with an activator in order to form an active catalyst. In at least one embodiment, a co-activator can be pre-mixed with the transition metal compound to form an alkylated transition metal compound.

Non-coordinating anion (NCA) is an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA coordinates weakly enough that a neutral Lewis base, such as an olefinically or acetylenically unsaturated monomer can displace it from the catalyst center. Any metal or metalloid that can form a compatible, weakly coordinating complex may be used or contained in the non-coordinating anion. Suitable metals include, but are not limited to, aluminum, gold, and platinum. Suitable metalloids include, but are not limited to, boron, aluminum, phosphorus, and silicon.

Unless otherwise indicated, for purposes of the present disclosure, the term "substituted" means that a hydrogen group has been replaced with a heteroatom, or a heteroatom containing group, such as halogen (such as Br, Cl, F or I) or a functional group such as —$NR^*_2$, —$OR^*$, —$SeR^*$, —$TeR^*$, —$PR^*_2$, —$AsR^*_2$, —$SbR^*_2$, —$SR^*$, —$BR^*_2$, —$SiR^*_3$, —$GeR^*_3$, —$SnR^*_3$, —$PbR^*_3$, —$(CH_2)q\text{-}SiR^*_3$, and the like, where q is 1 to 10 and each $R^*$ is independently a hydrocarbyl or halocarbyl radical, and two or more $R^*$ may join together to form a substituted or unsubstituted completely saturated, partially unsaturated, or aromatic cyclic or polycyclic ring structure), or where at least one heteroatom has been inserted within a hydrocarbyl ring.

Unless otherwise indicated, (e.g., the definition of "substituted hydrocarbyl", "substituted aromatic", etc.), the term "substituted" means that at least one hydrogen atom has been replaced with at least one non-hydrogen group, such as a hydrocarbyl group, a heteroatom, or a heteroatom containing group, such as halogen (such as Br, Cl, F or I) or a functional group such as —$NR^*_2$, —$OR^*$, —$SeR^*$, —$TeR^*$, —$PR^*_2$, —$AsR^*_2$, —$SbR^*_2$, —$SR^*$, —$BR^*_2$, —$SiR^*_3$, —$GeR^*_3$, —$SnR^*_3$, —$PbR^*_3$, —$(CH_2)q\text{-}SiR^*_3$, and the like, where q is 1 to 10 and each $R^*$ is independently a hydrocarbyl or halocarbyl radical, and two or more $R^*$ may join together to form a substituted or unsubstituted completely saturated, partially unsaturated, or aromatic cyclic or polycyclic ring structure), or where at least one heteroatom has been inserted within a hydrocarbyl ring. As an example, ethyl alcohol is an ethyl group substituted with an —OH group.

For purposes of the present disclosure, in relation to catalyst compounds, the term "substituted" means that a hydrogen group has been replaced with a hydrocarbyl group, a heteroatom, or a heteroatom containing group.

The term "substituted hydrocarbyl" means a hydrocarbyl radical in which at least one hydrogen atom of the hydrocarbyl radical has been substituted with at least one heteroatom (such as halogen, e.g., Br, Cl, F or I) or heteroatom-containing group (such as a functional group, e.g., —$NR^*_2$, —$OR^*$, —$SeR^*$, —$TeR^*$, —$PR^*_2$, —$AsR^*_2$, —$SbR^*_2$, —$SR^*$, —$BR^*_2$, —$SiR^*_3$, —$GeR^*_3$, —$SnR^*_3$, —$PbR^*_3$, —$(CH_2)q\text{-}SiR^*_3$, and the like, where q is 1 to 10 and each $R^*$ is independently a hydrocarbyl or halocarbyl radical, and two or more $R^*$ may join together to form a substituted or unsubstituted completely saturated, partially unsaturated, or aromatic cyclic or polycyclic ring structure), or where at least one heteroatom has been inserted within a hydrocarbyl ring.

The term "substituted aromatic," means an aromatic group having 1 or more hydrogen groups replaced by a hydrocarbyl, substituted hydrocarbyl, heteroatom or heteroatom containing group.

The term "hydrocarbyl substituted phenyl" means a phenyl group having 1, 2, 3, 4 or 5 hydrogen groups replaced by a hydrocarbyl or substituted hydrocarbyl group. Preferably the "hydrocarbyl substituted phenyl" group is represented by the formula:

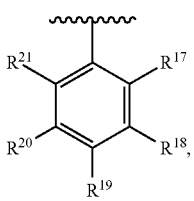

where each of $R^{17}$, $R^{18}$, $R^{19}$, $R^{20}$, and $R^{21}$ is independently selected from hydrogen, $C_1$-$C_{40}$ hydrocarbyl or $C_1$-$C_{40}$ substituted hydrocarbyl, a heteroatom or a heteroatom-containing group (provided that at least one of $R^{17}$, $R^{18}$, $R^{19}$, $R^{20}$, and $R^{21}$ is not H), or two or more of $R^{17}$, $R^{18}$, $R^{19}$, $R^{20}$, and $R^{21}$ are joined together to form a $C_4$-$C_{62}$ cyclic or polycyclic ring structure, or a combination thereof.

The term "substituted phenyl," mean a phenyl group having 1 or more hydrogen groups replaced by a hydrocarbyl, substituted hydrocarbyl, heteroatom or heteroatom containing group.

The term "substituted carbazole," means a carbazole group having 1 or more hydrogen groups replaced by a hydrocarbyl, substituted hydrocarbyl, heteroatom or heteroatom containing group.

The term "substituted naphthyl," means a naphthyl group having 1 or more hydrogen groups replaced by a hydrocarbyl, substituted hydrocarbyl, heteroatom or heteroatom containing group.

The term "substituted anthracenyl," means an anthracenyl group having 1 or more hydrogen groups replaced by a hydrocarbyl, substituted hydrocarbyl, heteroatom or heteroatom containing group.

The term "substituted fluorenyl" means a fluorenyl group having 1 or more hydrogen groups replaced by a hydrocarbyl, substituted hydrocarbyl, heteroatom or heteroatom containing group.

The term "substituted benzyl" means a benzyl group having 1 or more hydrogen groups replaced by a hydrocarbyl, substituted hydrocarbyl, heteroatom or heteroatom containing group, preferably a substituted benzyl" group is represented by the formula:

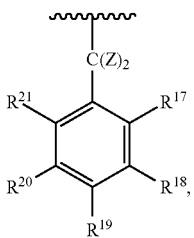

where each of $R^{17}$, $R^{18}$, $R^{19}$, $R^{20}$, $R^{21}$ and Z is independently selected from hydrogen, $C_1$-$C_{40}$ hydrocarbyl or $C_1$-$C_{40}$ substituted hydrocarbyl, a heteroatom or a heteroatom-containing group (provided that at least one of $R^{17}$, $R^{18}$, $R^{19}$, $R^{20}$, $R^{21}$ and Z is not H), or two or more of $R^{17}$, $R^{18}$, $R^{19}$, $R^{20}$, $R^{21}$ and Z are joined together to form a $C_4$-$C_{62}$ cyclic or polycyclic ring structure, or a combination thereof.

The terms "hydrocarbyl radical," "hydrocarbyl," and "hydrocarbyl group," are used interchangeably. Likewise, the terms "group," "radical," and "substituent" are also used interchangeably. For purposes of this disclosure, "hydrocarbyl radical" is defined to be $C_1$-$C_{100}$ hydrocarbon radicals, that may be linear, branched, or cyclic, and when cyclic, aromatic or non-aromatic. Examples of such radicals can include methyl, ethyl, n-propyl, isopropyl, n-butyl, isobutyl, sec-butyl, tert-butyl, pentyl, iso-amyl, hexyl, octyl, cyclopropyl, cyclobutyl, cyclopentyl, cyclohexyl, cyclooctyl.

The term "alkenyl" means a straight-chain, branched-chain, or cyclic hydrocarbon radical having one or more double bonds. These alkenyl radicals may be optionally substituted. Examples of suitable alkenyl radicals can include ethenyl, propenyl, allyl, 1,4-butadienyl cyclopropenyl, cyclobutenyl, cyclopentenyl, cyclohexenyl, cyclooctenyl, and the like, including their substituted analogues.

For purposes of the present disclosure, "alkoxides" include those where the alkyl group is a $C_1$ to $C_{10}$ hydrocarbyl. The alkyl group may be straight chain, branched, or cyclic. The alkyl group may be saturated or unsaturated. In at least one embodiment, the alkyl group may include at least one aromatic group. Preferably the term "alkoxy" or "alkoxide" means an alkyl ether or aryl ether radical. Examples of suitable alkyl ether radicals can include methoxy, ethoxy, n-propoxy, iso-propoxy, n-butoxy, iso-butoxy, sec-butoxy, tert-butoxy, phenoxyl, and the like.

The term "aryl" or "aryl group" means a six carbon aromatic ring and the substituted variants thereof, such as phenyl, 2-methyl-phenyl, xylyl, 4-bromo-xylyl. Likewise, heteroaryl means an aryl group where a ring carbon atom (or two or three ring carbon atoms) has been replaced with a heteroatom, such as N, O, or S. As used herein, the term "aromatic" also refers to pseudoaromatic heterocycles which are heterocyclic substituents that have similar properties and structures (nearly planar) to aromatic heterocyclic ligands, but are not by definition aromatic.

Where isomers of a named alkyl, alkenyl, alkoxide, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

The term "ring atom" means an atom that is part of a cyclic ring structure. By this definition, a benzyl group has six ring atoms and tetrahydrofuran has 5 ring atoms.

A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom-substituted ring.

The term "continuous" means a system that operates without interruption or cessation. For example, a continuous process to produce a polymer would be one where the reactants are continually introduced into one or more reactors and polymer product is continually withdrawn until the polymerization is stopped, e.g., at 300 minutes.

A solution polymerization means a polymerization process in which the polymer is dissolved in a liquid polymerization medium, such as an inert solvent or monomer(s) or their blends. A solution polymerization is homogeneous. A homogeneous polymerization is one where the polymer product is dissolved in the polymerization medium. Suitable systems may be not turbid as described in Oliveira, J. V. et al., *Ind. Eng. Chem. Res.*, 2000, v.29, p. 4627.

A bulk polymerization means a polymerization process in which the monomers and/or comonomers being polymerized are used as a solvent or diluent using little or no inert solvent as a solvent or diluent. A small fraction of inert solvent might be used as a carrier for catalyst and scavenger. A bulk polymerization system contains less than 25 wt % of inert solvent or diluent, such as less than 10 wt %, such as less than 1 wt %, such as 0 wt %.

Transition Metal Complexes

In at least one embodiment, the present disclosure relates to novel bridged transition metal complexes, where the complexes include at least one a $C_4$-$C_{62}$ cyclic or polycyclic ring structure with particular combinations of substituents and bridged with, for example, a tridentate ethylene bridged amine phenolate group. In at least one embodiment, the bridge is characterized in that it has at least one functionality, either included in the bridge or bonded to it.

This invention relates to catalyst compounds, and catalyst systems including such compounds, represented by formula (I):

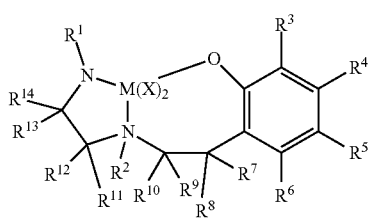

M is a group 4 metal, such as zirconium, titanium, and hafnium. In at least one embodiment, M is zirconium or hafnium, such as M is zirconium.

$R^1$ is an aromatic group or substituted aromatic group.

Each of $R^2$, $R^3$, $R^4$, $R^5$, $R^6$, $R^7$, $R^8$, $R^9$, $R^{10}$, $R^{11}$, $R^{12}$, $R^{13}$, and $R^{14}$ is independently hydrogen, $C_1$-$C_{40}$ hydrocarbyl or $C_1$-$C_{40}$ substituted hydrocarbyl, a heteroatom or a heteroatom-containing group (such as O, N, P, S), or two or more of $R^1$, $R^2$, $R^3$, $R^4$, $R^5$, $R^6$, $R^7$, $R^8$, $R^9$, $R^{10}$, $R^{11}$, $R^{12}$, $R^{13}$, and $R^{14}$ are joined together to form a $C_4$-$C_{62}$ cyclic or polycyclic ring structure, or a combination thereof. In embodiments of the invention, each of $R^1$, $R^2$, $R^3$, $R^4$, $R^5$, $R^6$, $R^7$, $R^8$, $R^9$, $R^{10}$, $R^{11}$, $R^{12}$, $R^{13}$, and $R^{14}$ is independently selected from methyl, ethyl, propyl, butyl, pentyl, hexyl, heptyl, octyl, nonyl, decyl, undecyl, dodecyl, phenyl, substituted phenyl (such as hydrocarbyl substituted phenyl), benzyl, substituted benzyl, biphenyl, substituted biphenyl, or an isomer thereof, which may be halogenated (such as perfluoropropyl, perfluorobutyl, perfluoroethyl, perfluoromethyl), substituted hydrocarbyl radicals and all isomers thereof (including trimethylsilylpropyl, trimethylsilylmethyl, trimethylsilylethyl); or two or more of $R^1$, $R^2$, $R^3$, $R^4$, $R^5$, $R^6$, $R^7$, $R^8$, $R^9$, $R^{10}$, $R^{11}$, $R^{12}$, $R^{13}$, and $R^{14}$ are joined together to form a $C_4$-$C_{62}$ cyclic or polycyclic ring structure, or a combination thereof. A heteroatom can be a halogen atom (such as Br, Cl, F, or I). $R^2$ can be hydrogen or $C_1$-$C_{40}$ hydrocarbyl, such as $C_1$-$C_{10}$ hydrocarbyl. In at least one embodiment, $R^4$, $R^5$, and $R^6$ can be hydrogen.

Preferably, in any embodiment of the invention described herein the hydrocarbyl substituted phenyl is represented by the formula:

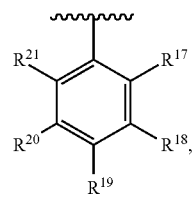

where each of $R^{17}$, $R^{18}$, $R^{19}$, $R^{20}$, and $R^{21}$ is independently selected from hydrogen, $C_1$-$C_{40}$ hydrocarbyl or $C_1$-$C_{40}$ substituted hydrocarbyl, a heteroatom or a heteroatom-containing group, or two or more of $R^{17}$, $R^{18}$, $R^{19}$, $R^{20}$, and $R^{21}$ are joined together to form a $C_4$-$C_{62}$ cyclic or polycyclic ring structure, or a combination thereof. Preferably, each of $R^{17}$, $R^{18}$, $R^{19}$, $R^{20}$, and $R^{21}$ is independently selected from methyl, ethyl, propyl, butyl, pentyl, hexyl, heptyl, octyl, nonyl, decyl, undecyl, dodecyl, phenyl, substituted phenyl (such as hydrocarbyl substituted phenyl), biphenyl or an isomer thereof, a heteroatom or a heteroatom-containing group. Preferably, the phenyl group is substituted at the meta or para positions, such as the 3' and/or 5' positions (e.g., $R^{18}$ and $R^{20}$), such as with $C_4$ to $C_{12}$ alkyl groups. Alternately the phenyl group may be substituted at the 2' position (e.g., $R^{17}$), but is not substituted in the 2' and 6' positions (e.g., $R^{17}$ and $R^{21}$). Preferably, when the 2' position of the phenyl is substituted, the 6' position is H). In a preferred embodiment, $R^{18}$ and $R^{20}$ are t-butyl.

The term "hydrocarbyl substituted phenyl" includes all isomers thereof, such as methylphenyl, dimethylphenyl, trimethylphenyl, tetramethylphenyl, pentamethylphenyl, diethylphenyl, triethylphenyl, propylphenyl, dipropylphenyl, tripropylphenyl, dimethylethylphenyl, dimethylpropylphenyl, dimethylbutylphenyl, dipropylmethylphenyl, and the like.

In embodiments of the invention, each X is independently $C_1$-$C_{20}$ hydrocarbyl or $C_1$-$C_{20}$ substituted hydrocarbyl which include, but are not limited to, methyl, ethyl, propyl, butyl, pentyl, hexyl, heptyl, octyl, nonyl, decyl, undecyl, dodecyl, phenyl, substituted phenyl (such as hydrocarbyl substituted phenyl), benzyl, substituted benzyl, biphenyl, substituted biphenyl, or an isomer thereof, including perfluoropropyl, perfluorobutyl, perfluoroethyl, perfluoromethyl, and substituted hydrocarbyl radicals and all isomers of thereof including trimethylsilylpropyl, trimethylsilylmethyl, trimethylsilylethyl. Alternately, each X is independently a heteroatom or a heteroatom-containing group (such as O, N, P, S), or two or more Xs join together to form a $C_4$-$C_{62}$ cyclic or polycyclic ring structure. Particularly, each X can be selected from methyl, benzyl, or chloro, such as X is benzyl.

In at least one embodiment, $R^1$ is represented by the structure:

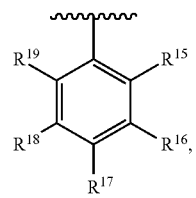

where each of $R^{15}$, $R^{16}$, $R^{17}$, $R^{18}$, and $R^{19}$ is independently selected from hydrogen, $C_1$-$C_{40}$ hydrocarbyl or $C_1$-$C_{40}$ substituted hydrocarbyl, a heteroatom or a heteroatom-containing group, or two or more of $R^{15}$, $R^{16}$, $R^{17}$, $R^{18}$, and $R^{19}$ are joined together to form a $C_4$-$C_{62}$ cyclic or polycyclic ring structure, or a combination thereof. In at least one embodiment, each of $R^5$, $R^{16}$, $R^{17}$, $R^{18}$, and $R^{19}$ is independently selected from methyl, ethyl, propyl, butyl, pentyl, hexyl, heptyl, octyl, nonyl, decyl, undecyl, dodecyl, phenyl, substituted phenyl, benzyl, substituted benzyl, biphenyl, substituted biphenyl, or an isomer thereof, a heteroatom or a heteroatom-containing group.

In at least one embodiment, each of $R^{15}$, $R^{16}$, $R^{17}$, $R^{18}$, and $R^{19}$ is independently selected from hydrogen and $C_1$-$C_{40}$ hydrocarbyl, such as $R^{15}$ is $C_1$-$C_{10}$ hydrocarbyl, such as one or more of (or each of) $R^{15}$, $R^{16}$, $R^{17}$, $R^{18}$, and $R^{19}$ is methyl, ethyl, propyl, isopropyl, butyl, isobutyl, tert-butyl, pentyl, hexyl, heptyl, octyl, nonyl, decyl, phenyl, substituted phenyl, biphenyl or an isomer thereof, such as $R^{15}$ is isopropyl. Alternatively, each of $R^{16}$, $R^{17}$, $R^{18}$ and $R^{19}$ can be hydrogen. Alternatively, $R^{15}$ and $R^{19}$ are independently selected from $C_1$-$C_{10}$ hydrocarbyl, such as each of $R^{15}$ and $R^{19}$ is independently methyl, ethyl, propyl, isopropyl, butyl, isobutyl, tert-butyl, pentyl, hexyl, heptyl, octyl, nonyl, decyl, phenyl, substituted phenyl, biphenyl or an isomer thereof, such as each of $R^{15}$ and $R^{19}$ is isopropyl.

In at least one embodiment, $R^3$ is selected from unsubstituted phenyl, substituted phenyl, unsubstituted carbazole, substituted carbazole, unsubstituted naphthyl, substituted naphthyl, unsubstituted anthracenyl, substituted anthracenyl, unsubstituted fluorenyl, or substituted fluorenyl, a heteroatom or a heteroatom-containing group, such as $R^3$ is unsubstituted phenyl or unsubstituted carbazole. Alternately, $R^3$ can be a heteroatom, such as $R^3$ can be a halogen atom (such as Br, Cl, F, or I). In at least one embodiment, $R^3$ is Br.

In at least one embodiment, each of $R^7$, $R^8$, $R^9$, $R^{10}$, $R^{11}$, $R^{12}$, $R^{13}$ and $R^{14}$ is independently selected from hydrogen and $C_1$-$C_{10}$ hydrocarbyl. Alternately, three or more of $R^7$, $R^8$, $R^9$, $R^{10}$, $R^{11}$, $R^{12}$, $R^{13}$ and $R^{14}$ are hydrogen, such as each of $R^7$, $R^8$, $R^9$, $R^{10}$, $R^{11}$, $R^{12}$, $R^{13}$ and $R^{14}$ is hydrogen.

In at least one embodiment, the catalyst compound is one or more of:

1
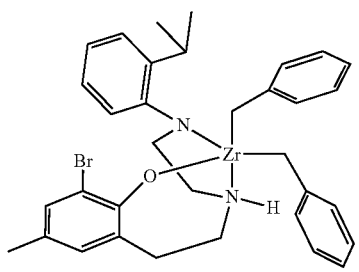

2
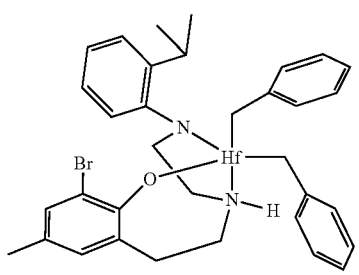

3
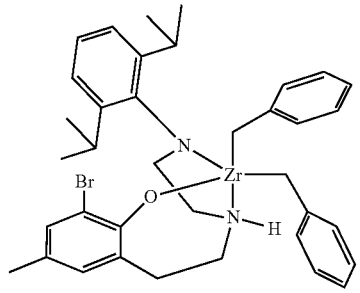

4
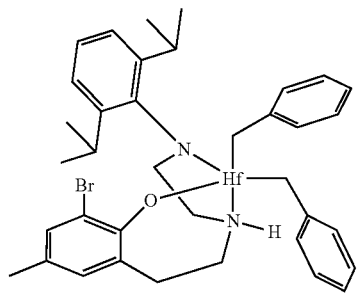

5
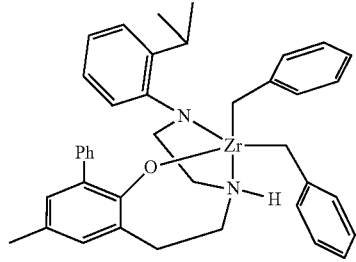

6
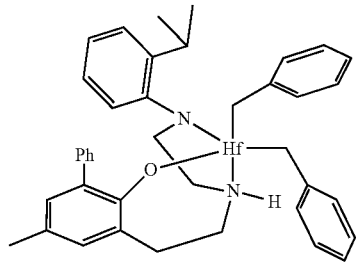

7
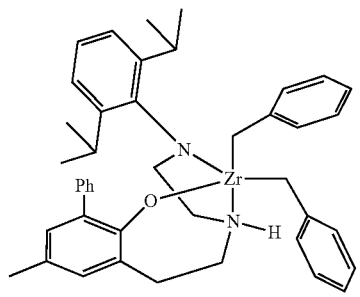

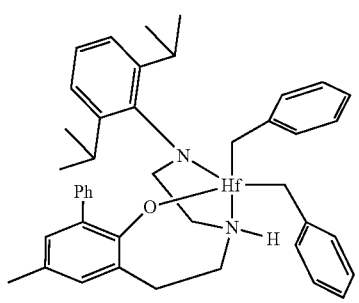
7
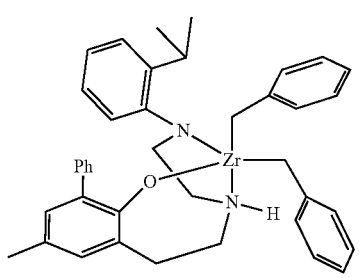
8
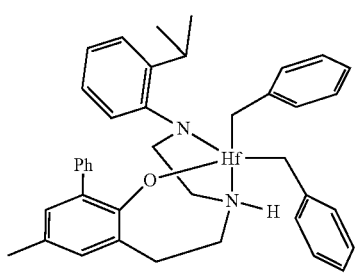
9
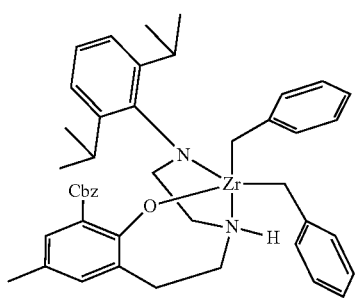
10
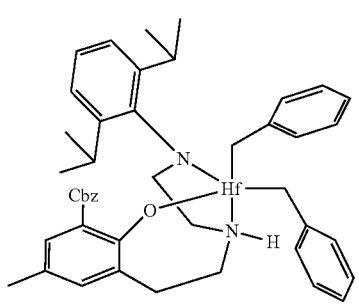
11
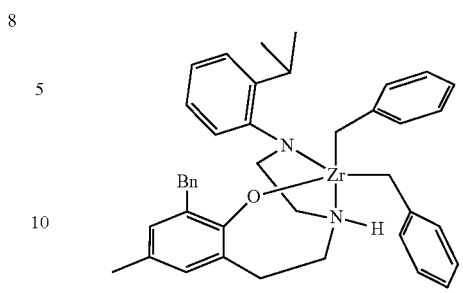
12
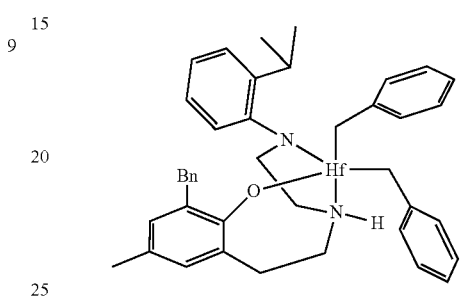
13
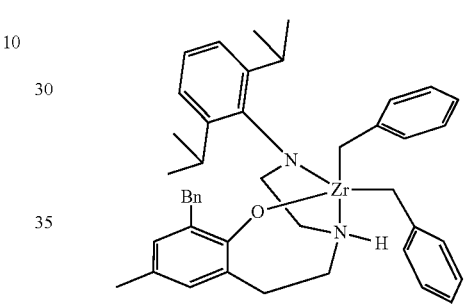
14
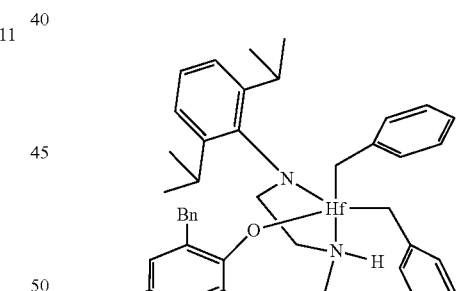
15
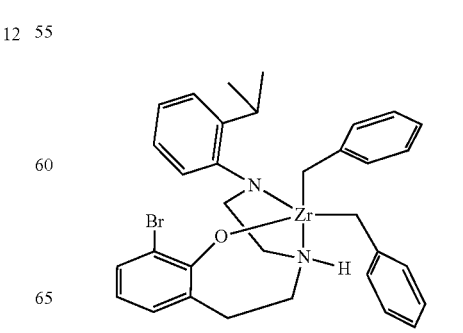
16

18
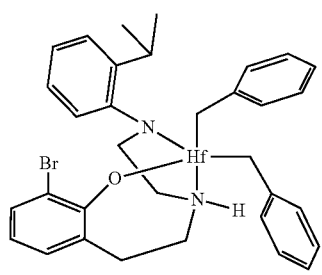
19
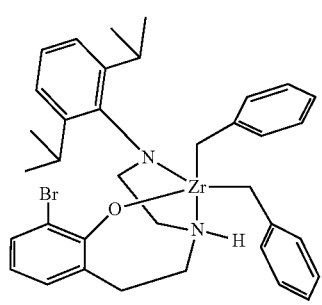
20
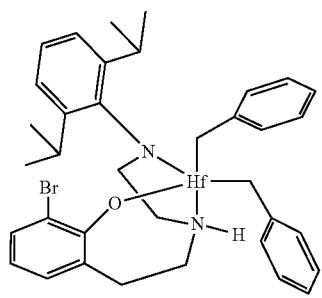
21
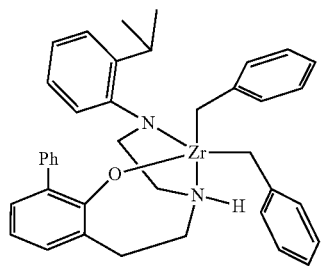
22
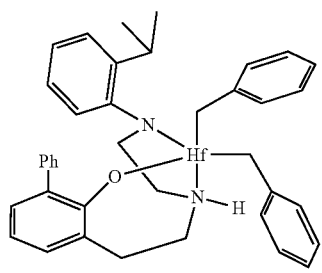
23
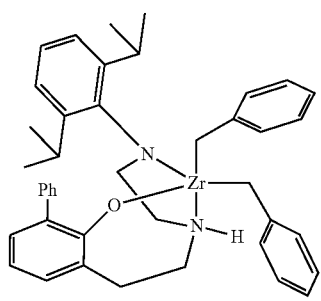
24
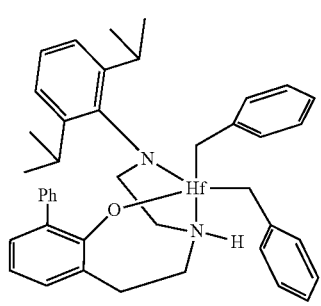
25
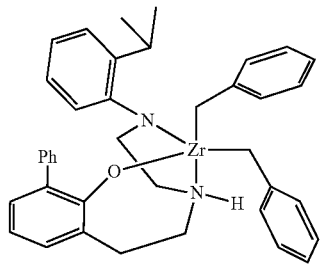
26
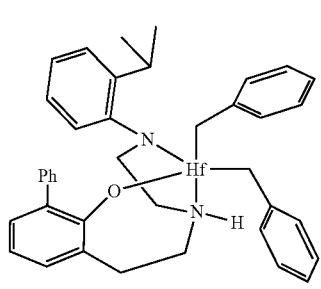
27
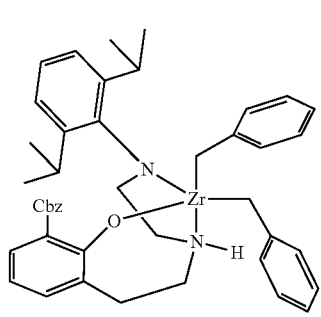

-continued

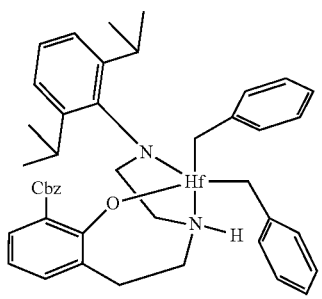

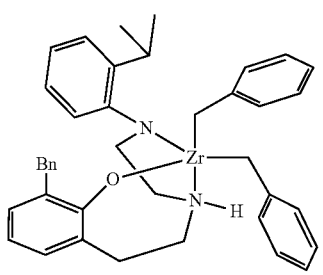

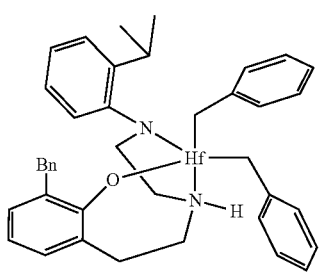

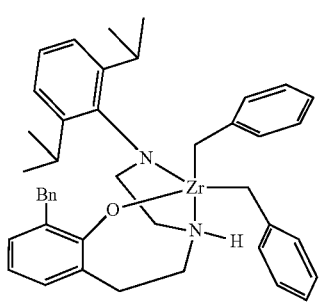

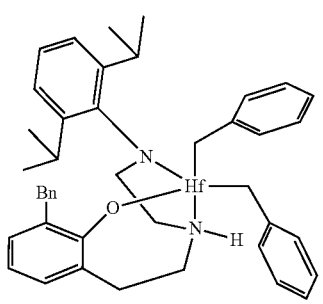

In at least one embodiment, the catalyst compound represented by formula (I) is selected from:

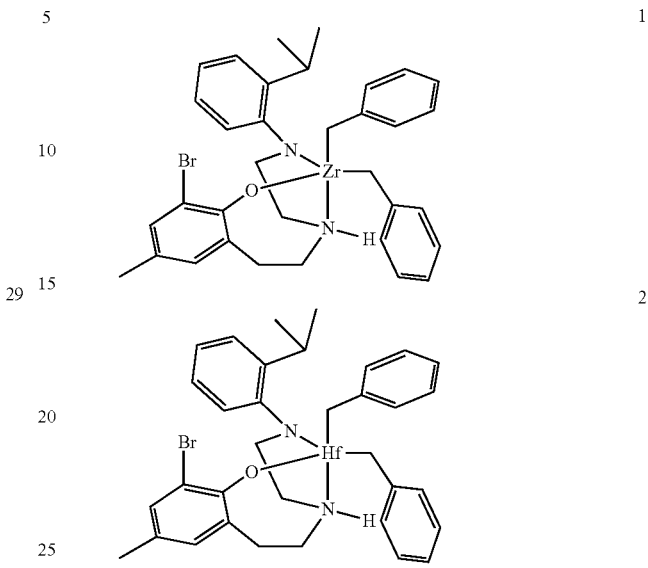

In at least one embodiment, one or more different catalyst compounds are present in a catalyst system. In at least one embodiment, one or more different catalyst compounds are present in the reaction zone where the process(es) described herein occur. When at least two transition metal compound based catalysts are used in one reactor as a mixed catalyst system, the two transition metal compounds can be chosen such that the two are compatible. A simple screening method such as by $^1$H or $^{13}$C NMR, known to those of ordinary skill in the art, can be used to determine which transition metal compounds are compatible. The same activator can be used for the transition metal compounds, however, two different activators, such as a non-coordinating anion activator and an alumoxane, can be used in combination. If one or more transition metal compounds contain an X ligand which is not a hydride, hydrocarbyl, or substituted hydrocarbyl, then the alumoxane should be contacted with the transition metal compounds prior to addition of the non-coordinating anion activator.

The two transition metal compounds (pre-catalysts) may be used in any ratio. Molar ratios of (A) transition metal compound to (B) transition metal compound can be a range of (A:B) of from 1:1000 to 1000:1, alternatively 1:100 to 500:1, alternatively 1:10 to 200:1, alternatively 1:1 to 100:1, and alternatively 1:1 to 75:1, and alternatively 5:1 to 50:1. The particular ratio chosen will depend on the exact pre-catalysts chosen, the method of activation, and the end product desired. In at least one embodiment, when using the two pre-catalysts, where both are activated with the same activator, mole percentages, based upon the molecular weight of the pre-catalysts, can be from 10% to 99.9% A to 0.1% to 90% B, alternatively 25% to 99% A to 0.5% to 75% B, alternatively 50% to 99% A to 1% to 50% B, and alternatively 75% to 99% A to 1% to 10% B.

Methods to Prepare the Catalyst Compounds

The following is a generic scheme to prepare a catalyst described herein and further exemplified in the examples. Generally, catalyst compounds of this type can be synthesized as shown below where the ethylamine (A) and the protected ketone (B) are condensed, then deprotected under acidic conditions in order to form the desired ligand, which can be further complexed to the tetrabenzyl-M (with M=Zr or Hf). The ethylamine (A) can be synthesized by reacting 2-isopropylaniline with 2-bromoethylamine hydrobromide. The protected ketone (B) can be formed using 2-bromo-4-methylphenol as starting material. Allylation and rearrangement of the starting material using allyl bromide and potassium carbonate at high temperature yields the 2-allyl-6-bromo-4-methylphenol. Protection of the hydroxyl moiety using methoxy methyl chloride, followed by ozonolysis, can provide protected ketone (B). Compounds (A) and (B) can undergo nucleophilic condensation in order to form a corresponding imine, which can be reduced via a borohydride reducing agent (e.g., sodium triacetoxyborohydride reducing agent) in order to form a ligand compound. The resulting ligand can undergo metallation with tetrabenzyl-M (with M=Zr or Hf), thus yielding to the desired catalyst.

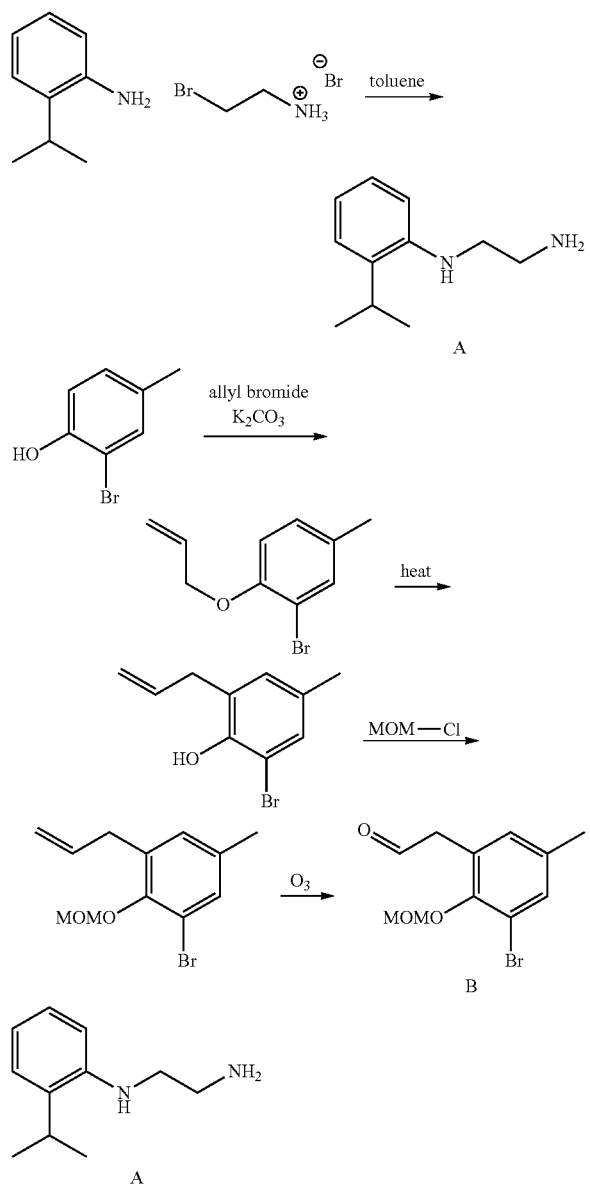

Scheme 1. Amine Bridged Anilide Phenolate Catalyst Compounds

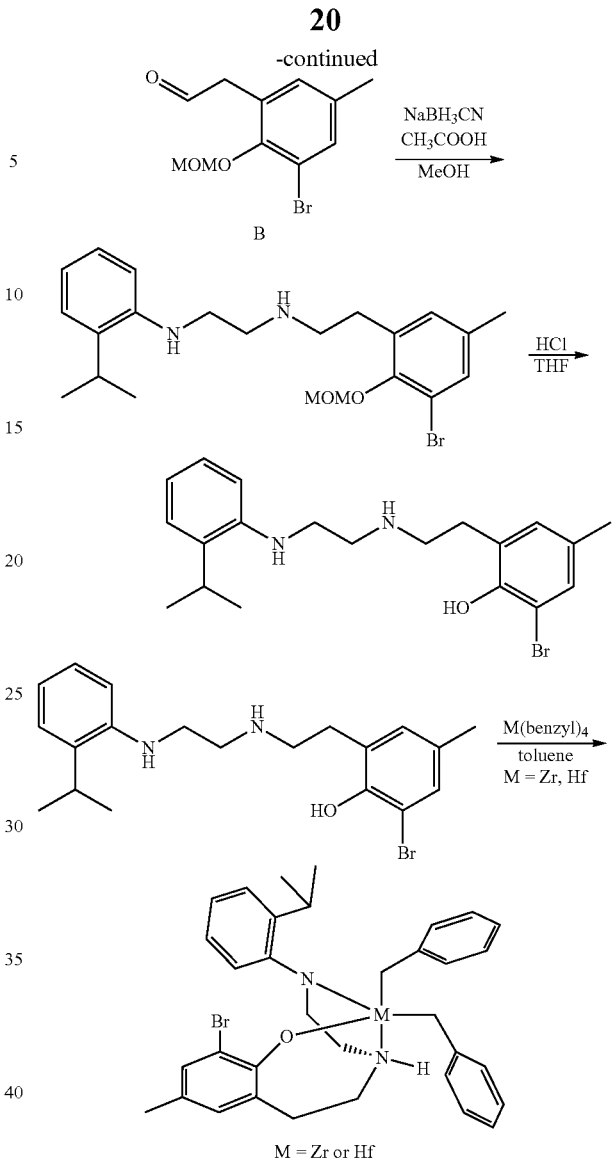

M = Zr or Hf

Activators

The terms "cocatalyst" and "activator" are used herein interchangeably and are defined to be a compound which can activate a catalyst compound of the present disclosure by converting the neutral catalyst compound to a catalytically active catalyst compound cation.

After the complexes described above have been synthesized, catalyst systems may be formed by combining them with activators in any suitable manner including by supporting them for use in slurry or gas phase polymerization. The catalyst systems may also be added to or generated in solution polymerization or bulk polymerization (in the monomer). Suitable catalyst systems may include a complex as described above and an activator such as alumoxane or a non-coordinating anion.

Non-limiting activators, for example, include alumoxanes, aluminum alkyls, ionizing activators, which may be neutral or ionic, and conventional-type cocatalysts. Activators can include alumoxane compounds, modified alumoxane compounds, and ionizing anion precursor compounds that abstract a reactive, σ-bound, metal ligand making the metal complex cationic and providing a charge-balancing non-coordinating or weakly coordinating anion.

In at least one embodiment, the catalyst system includes an activator and the catalyst compound of formula (I).

Alumoxane Activators

In at least one embodiment, alumoxane activators are utilized as an activator in the catalyst system. Alumoxanes are generally oligomeric compounds containing —Al(R')—O— sub-units, where R' is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be suitable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584). Another useful alumoxane is solid polymethylaluminoxane as described in U.S. Pat. Nos. 9,340,630; 8,404,880; and 8,975,209. Aluminum alkyls are available as hydrocarbon solutions from commercial sources. Methylalumoxane ("MAO") is available from Albemarle as a 30 wt % solution in toluene.

When the activator is an alumoxane (modified or unmodified), in at least one embodiment, select the maximum amount of activator at up to a 5,000-fold molar excess Al/M over the catalyst compound (per metal catalytic site). The minimum activator-to-catalyst-compound is a 1:1 molar ratio. Alternate ranges include from 1:1 to 500:1, alternately from 1:1 to 200:1, alternately from 1:1 to 100:1, or alternately from 1:1 to 50:1.

In an alternate embodiment, little or no alumoxane is used in the polymerization processes described herein. For example, alumoxane is present at zero mole %, alternately the alumoxane is present at a molar ratio of aluminum to catalyst compound transition metal less than 500:1, such as less than 300:1, such as less than 100:1, such as less than 1:1.

Non-Coordinating Anion Activators

A non-coordinating anion (NCA) is defined to mean an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA coordinates weakly enough that a neutral Lewis base, such as an olefinically or acetylenically unsaturated monomer can displace it from the catalyst center. Any metal or metalloid that can form a compatible, weakly coordinating complex may be used or contained in the non-coordinating anion. Suitable metals include, but are not limited to, aluminum, gold, and platinum. Suitable metalloids include, but are not limited to, boron, aluminum, phosphorus, and silicon.

"Compatible" non-coordinating anions can be those which are not degraded to neutrality when the initially formed complex decomposes. Further, the anion might not transfer an anionic substituent or fragment to the cation so as to cause it to form a neutral transition metal compound and a neutral by-product from the anion. Non-coordinating anions can be those that are compatible, stabilize the transition metal cation in the sense of balancing its ionic charge at +1, and yet retain sufficient lability to permit displacement during polymerization.

It is within the scope of the present disclosure to use an ionizing or stoichiometric activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 1998/043983), boric acid (U.S. Pat. No. 5,942,459), or combination thereof. It is also within the scope of the present disclosure to use neutral or ionic activators alone or in combination with alumoxane or modified alumoxane activators.

The catalyst systems of the present disclosure can include at least one non-coordinating anion (NCA) activator. In at least one embodiment, boron containing NCA activators represented by the formula below can be used:

$$Z_d^+(A^{d-})$$

where: Z is (L-H) or a reducible Lewis acid; L is a neutral Lewis base; H is hydrogen; (L-H) is a Bronsted acid; $A^{d-}$ is a boron containing non-coordinating anion having the charge d−; d is 1, 2, or 3.

The cation component, $Z_d^+$ may include Bronsted acids such as protons or protonated Lewis bases or reducible Lewis acids capable of protonating or abstracting a moiety, such as an alkyl or aryl, from the bulky ligand transition metal catalyst precursor, resulting in a cationic transition metal species.

The activating cation $Z_d^+$ may also be a moiety such as silver, tropylium, carboniums, ferroceniums and mixtures, such as carboniums and ferroceniums. $Z_d^+$ can be triphenyl carbonium. Reducible Lewis acids can be a triaryl carbonium (where the aryl can be substituted or unsubstituted, such as those represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl), such as the reducible Lewis acids in formula (14) above as "Z" include those represented by the formula: $(Ph_3C)$, where Ph is a substituted or unsubstituted phenyl, such as substituted with $C_1$ to $C_{40}$ hydrocarbyls or substituted a $C_1$ to $C_{40}$ hydrocarbyls, such as $C_1$ to $C_{20}$ alkyls or aromatics or substituted $C_1$ to $C_{20}$ alkyls or aromatics, such as Z is a triphenylcarbonium.

When $Z_d^+$ is the activating cation $(L-H)_d^+$, it can be a Bronsted acid, capable of donating a proton to the transition metal catalytic precursor resulting in a transition metal cation, including ammoniums, oxoniums, phosphoniums, silyliums, and mixtures thereof, such as ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiums from ethers such as dimethyl ether diethyl ether, tetrahydrofuran and dioxane, sulfoniums from thioethers, such as diethyl thioethers, tetrahydrothiophene, and mixtures thereof.

The anion component $A^{d-}$ includes those having the formula $[M^{k+}Q_n]^{d-}$ where k is 1, 2, or 3; n is 1, 2, 3, 4, 5, or 6 (such as 1, 2, 3, or 4); n−k=d; M is an element selected from Group 13 of the Periodic Table of the Elements, such as boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Each Q can be a fluorinated hydrocarbyl group having 1 to 20 carbon atoms, such as each Q is a fluorinated aryl group, and such as each Q is a pentafluoryl aryl group. Examples of suitable $A^{d-}$ also include diboron compounds as disclosed in U.S. Pat. No. 5,447,895, which is fully incorporated herein by reference.

Illustrative, but not limiting, examples of boron compounds which may be used as an activating cocatalyst are the compounds described as (and particularly those specifically listed as) activators in U.S. Pat. No. 8,658,556, which is incorporated by reference herein.

The ionic stoichiometric activator $Z_d+(A^{d-})$ can be one or more of N,N-dimethylanilinium tetra(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetra(perfluorophenyl)borate.

Bulky activators are also useful herein as NCAs. "Bulky activator" as used herein refers to anionic activators represented by the formula:

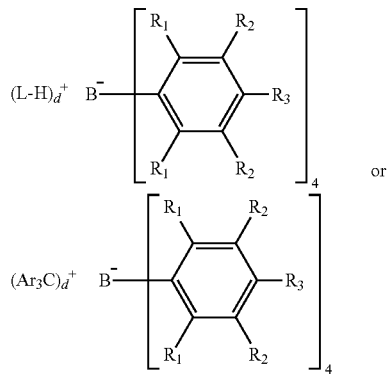

where:
each $R_1$ is independently a halide, such as a fluoride;
Ar is substituted or unsubstituted aryl group (such as a substituted or unsubstituted phenyl), such as substituted with $C_1$ to $C_{40}$ hydrocarbyls, such as $C_1$ to $C_{20}$ alkyls or aromatics;
each $R_2$ is independently a halide, a $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (such as $R_2$ is a fluoride or a perfluorinated phenyl group);
each $R_3$ is a halide, $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (such as $R_3$ is a fluoride or a $C_6$ perfluorinated aromatic hydrocarbyl group); where $R_2$ and $R_3$ can form one or more saturated or unsaturated, substituted or unsubstituted rings (such as $R_2$ and $R_3$ form a perfluorinated phenyl ring);
L is a neutral Lewis base; $(L-H)^+$ is a Bronsted acid; d is 1, 2, or 3;
where the anion has a molecular weight of greater than 1020 g/mol; and where at least three of the substituents on the B atom each have a molecular volume of greater than 250 cubic Å, alternately greater than 300 cubic Å, or alternately greater than 500 cubic Å.

For example, $(Ar_3C)_d^+$ can be $(Ph_3C)_d^+$, where Ph is a substituted or unsubstituted phenyl, such as substituted with $C_1$ to $C_{40}$ hydrocarbyls or substituted $C_1$ to $C_{40}$ hydrocarbyls, such as $C_1$ to $C_{20}$ alkyls or aromatics or substituted $C_1$ to $C_{20}$ alkyls or aromatics.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple "Back of the Envelope" Method for Estimating the Densities and Molecular Volumes of Liquids and Solids," *Journal of Chemical Education*, v.71(11), November 1994, pp. 962-964. Molecular volume (MV), in units of cubic Å, is calculated using the formula: $MV=8.3V_s$, where $V_s$ is the scaled volume. $V_s$ is the sum of the relative volumes of the constituent atoms, and is calculated from the molecular formula of the substituent using the following table of relative volumes. For fused rings, the $V_s$ is decreased by 7.5% per fused ring.

| Element | Relative Volume |
|---|---|
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

For a list of particularly useful Bulky activators please see U.S. Pat. No. 8,658,556, which is incorporated by reference herein.

In another embodiment, one or more of the NCA activators is chosen from the activators described in U.S. Pat. No. 6,211,105.

Exemplary activators include N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Me$_3$NH$^+$][B(C$_6$F$_5$)$_4^-$], 1-(4-(tris(pentafluorophenyl)borate)-2,3,5,6-tetrafluorophenyl)pyrrolidinium, and tetrakis(pentafluorophenyl)borate, 4-(tris(pentafluorophenyl)borate)-2,3,5,6-tetrafluoropyridine.

In at least one embodiment, the activator includes a triaryl carbenium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthyl)borate, triphenylcarbenium tetrakis(perfluorobiphenyl)borate, and triphenylcarbenium tetrakis(3,5-bis(trifluoromethyl)phenyl)borate).

In another embodiment, the activator includes one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis(perfluoronaphthyl)borate, N,N-dialkylanilinium tetrakis(perfluoronaphthyl)borate, trialkylammonium tetrakis(perfluorobiphenyl)borate, N,N-dialkylanilinium tetrakis(perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl) phenyl)borate, and di-(i-propyl)ammonium tetrakis(pentafluorophenyl)borate (where alkyl is methyl, ethyl, propyl, n-butyl, sec-butyl, or t-butyl).

Suitable activator-to-catalyst ratio, e.g., all NCA activators-to-catalyst ratio may be about a 1:1 molar ratio. Alternate ranges include from 0.1:1 to 100:1, alternately from 0.5:1 to 200:1, alternately from 1:1 to 500:1, alternately from 1:1 to 1000:1. A particularly useful range is from 0.5:1 to 10:1, such as 1:1 to 5:1.

It is also within the scope of the present disclosure that the catalyst compounds can be combined with combinations of alumoxanes and NCA's (see for example, U.S. Pat. Nos. 5,153,157; 5,453,410; EP 0 573 120 B1; WO 1994/007928; and WO 1995/014044 which discuss the use of an alumoxane in combination with an ionizing activator).

Useful chain transfer agents can be alkylalumoxanes, a compound represented by the formula $AlR_3$, $ZnR_2$ (where each R is, independently, a $C_1$-$C_8$ aliphatic radical, such as methyl, ethyl, propyl, butyl, pentyl, hexyl octyl or an isomer thereof) or a combination thereof, such as diethyl zinc, methylalumoxane, trimethylaluminum, triisobutylaluminum, trioctylaluminum, or a combination thereof.

Optional Scavengers or Co-Activators

In addition to these activator compounds, scavengers or co-activators may be used. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and diethyl zinc.

Optional Support Materials

In embodiments herein, the catalyst system may include an inert support material. The supported material can be a porous support material, for example, talc, and inorganic oxides. Other support materials include zeolites, clays, organoclays, or another organic or inorganic support material and the like, or mixtures thereof.

The support material can be an inorganic oxide in a finely divided form. Suitable inorganic oxide materials for use in catalyst systems herein include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be employed, for example, finely divided functionalized polyolefins, such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Support materials include $Al_2O_3$, $ZrO_2$, $SiO_2$, $SiO_2/Al_2O_3$, $SiO_2/TiO_2$, silica clay, silicon oxide/clay, or mixtures thereof.

The support material, such as an inorganic oxide, can have a surface area in the range of from about 10 $m^2/g$ to about 700 $m^2/g$, pore volume in the range of from about 0.1 $cm^3/g$ to about 4.0 $cm^3/g$ and average particle size in the range of from about 5 μm to about 500 μm. The surface area of the support material can be in the range of from about 50 $m^2/g$ to about 500 $m^2/g$, pore volume of from about 0.5 $cm^3/g$ to about 3.5 $cm^3/g$ and average particle size of from about 10 μm to about 200 μm. For example, the surface area of the support material is in the range is from about 100 $m^2/g$ to about 400 $m^2/g$, pore volume from about 0.8 $cm^3/g$ to about 3.0 $cm^3/g$ and average particle size is from about 5 μm to about 100 μm. The average pore size of the support material useful in the present disclosure is in the range of from 10 Å to 1000 Å, such as 50 Å to about 500 Å, and such as 75 Å to about 350 Å. In at least one embodiment, the support material is a high surface area, amorphous silica (surface area=300 $m^2$/gm; pore volume of 1.65 $cm^3$/gm). Silicas can be marketed under the tradenames of DAVISON 952 or DAVISON 955 by the Davison Chemical Division of W.R. Grace and Company. In other embodiments DAVISON 948 is used. Alternatively, a silica can be ES-70™ silica (PQ Corporation, Malvern, Pa.) that has been calcined at 875° C.

The support material should be dry, that is, free of absorbed water. Drying of the support material can be effected by heating or calcining at about 100° C. to about 1,000° C., such as at least about 600° C. When the support material is silica, it is heated to at least 200° C., such as about 200° C. to about 850° C., and such as at about 600° C.; and for a time of about 1 minute to about 100 hours, from about 12 hours to about 72 hours, or from about 24 hours to about 60 hours. The calcined support material must have at least some reactive hydroxyl (OH) groups to produce supported catalyst systems of the present disclosure. The calcined support material is then contacted with at least one polymerization catalyst comprising at least one catalyst compound and an activator.

The support material, having reactive surface groups, such as hydroxyl groups, is slurried in a non-polar solvent and the resulting slurry is contacted with a solution of a catalyst compound and an activator. In at least one embodiment, the slurry of the support material is first contacted with the activator for a period of time in the range of from about 0.5 hrs. to about 24 hrs., from about 2 hrs. to about 16 hrs., or from about 4 hrs. to about 8 hrs. The solution of the catalyst compound is then contacted with the isolated support/activator. In at least one embodiment, the supported catalyst system is generated in situ. In alternate embodiment, the slurry of the support material is first contacted with the catalyst compound for a period of time in the range of from about 0.5 hrs. to about 24 hrs., from about 2 hrs. to about 16 hrs., or from about 4 hrs. to about 8 hrs. The slurry of the supported catalyst compound is then contacted with the activator solution.

The mixture of the catalyst compound, activator and support is heated to about 0° C. to about 70° C., such as about 23° C. to about 60° C., such as at room temperature. Contact times may range from about 0.5 hrs. to about 24 hrs., from about 2 hrs. to about 16 hrs., or from about 4 hrs. to about 8 hrs.

Suitable non-polar solvents are materials in which all of the reactants used herein, i.e., the activator and the catalyst compound, are at least partially soluble and which are liquid at reaction temperatures. Non-polar solvents can be alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

In at least one embodiment, the support material includes a support material treated with an electron-withdrawing anion. The support material can be silica, alumina, silica-alumina, silica-zirconia, alumina-zirconia, aluminum phosphate, heteropolytungstates, titania, magnesia, boria, zinc oxide, mixed oxides thereof, or mixtures thereof; and the electron-withdrawing anion is selected from fluoride, chloride, bromide, phosphate, triflate, bisulfate, sulfate, or a combination thereof.

The electron-withdrawing component used to treat the support material can be a component that increases the Lewis or Bronsted acidity of the support material upon treatment (as compared to the support material that is not treated with at least one electron-withdrawing anion). In at least one embodiment, the electron-withdrawing component is an electron-withdrawing anion derived from a salt, an acid, or other compound, such as a volatile organic compound, that serves as a source or precursor for that anion. Electron-withdrawing anions can be sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, or mixtures thereof, or combinations thereof. An electron-withdrawing anion can be fluoride, chloride, bromide, phosphate, triflate, bisulfate, or sulfate, or a combination thereof, at least one embodiment of this disclosure. In at least one embodiment, the electron-withdrawing anion is sulfate, bisulfate, fluoride, chloride, bromide, iodide, fluorosulfate, fluoroborate, phosphate, fluorophosphate, trifluoroacetate, triflate, fluorozirconate, fluorotitanate, or combinations thereof.

Thus, for example, the support material suitable for use in the catalyst systems of the present disclosure can be one or more of fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, or combinations thereof. In at least one embodiment, the activator-support can be, or can include, fluorided alumina, sulfated alumina, fluorided silica-alumina, sulfated silica-alumina, fluorided silica-coated alumina, sulfated silica-coated alumina, phosphated silica-coated alumina, or combinations thereof. In another embodiment, the support material includes alumina treated with hexafluorotitanic acid, silica-coated alumina treated with hexafluorotitanic acid, silica-alumina treated with hexafluorozirconic acid, silica-alumina treated with trifluoroacetic acid, fluorided boria-alumina, silica treated with tetrafluoroboric acid, alumina treated with tetrafluoroboric acid, alumina treated with hexafluorophosphoric acid, or combinations thereof. Further, one or more of these activator-supports optionally can be treated with a metal ion.

Nonlimiting examples of cations suitable for use in the present disclosure in the salt of the electron-withdrawing anion include ammonium, trialkyl ammonium, tetraalkyl ammonium, tetraalkyl phosphonium, $H^+$, $[H(OEt_2)_2]^+$, or combinations thereof.

Further, combinations of one or more different electron-withdrawing anions, in varying proportions, can be used to tailor the specific acidity of the support material to a desired level. Combinations of electron-withdrawing components can be contacted with the support material simultaneously or individually, and in any order that provides a desired chemically-treated support material acidity. For example, in at least one embodiment, two or more electron-withdrawing anion source compounds in two or more separate contacting steps.

In at least one embodiment of the present disclosure, one example of a process by which a chemically-treated support material is prepared is as follows: a selected support material, or combination of support materials, can be contacted with a first electron-withdrawing anion source compound to form a first mixture; such first mixture can be calcined and then contacted with a second electron-withdrawing anion source compound to form a second mixture; the second mixture can then be calcined to form a treated support material. In such a process, the first and second electron-withdrawing anion source compounds can be either the same or different compounds.

The method by which the oxide is contacted with the electron-withdrawing component, such as a salt or an acid of an electron-withdrawing anion, can include gelling, co-gelling, impregnation of one compound onto another, or combinations thereof. Following a contacting method, the contacted mixture of the support material, electron-withdrawing anion, and optional metal ion, can be calcined.

According to another embodiment of the present disclosure, the support material can be treated by a process comprising: (i) contacting a support material with a first electron-withdrawing anion source compound to form a first mixture; (ii) calcining the first mixture to produce a calcined first mixture; (iii) contacting the calcined first mixture with a second electron-withdrawing anion source compound to form a second mixture; and (iv) calcining the second mixture to form the treated support material.

Polymerization Processes

The present disclosure relates to polymerization processes where monomer (such as propylene), and optionally comonomer, are contacted with a catalyst system comprising an activator and at least one catalyst compound, as described above. The catalyst compound and activator may be combined in any order, and are combined prior to contacting with the monomer.

Monomers include substituted or unsubstituted $C_2$ to $C_{40}$ alpha olefins, such as $C_2$ to $C_{20}$ alpha olefins, such as $C_2$ to $C_{12}$ alpha olefins, such as ethylene, propylene, butene, pentene, hexene, heptene, octene, nonene, decene, undecene, dodecene and isomers thereof. In at least one embodiment, the monomer includes propylene and an optional comonomer comprising one or more ethylene or $C_4$ to $C_{40}$ olefins, such as $C_4$ to $C_{20}$ olefins, such as $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In at least one embodiment, the monomer includes ethylene and an optional comonomer comprising one or more $C_3$ to $C_{40}$ olefins, such as $C_4$ to $C_{20}$ olefins, such as $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, such as hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, such as norbornene, norbornadiene, and dicyclopentadiene.

In at least one embodiment, one or more dienes are present in the polymer produced herein at up to 10 wt %, such as at 0.00001 wt % to 1.0 wt %, such as 0.002 wt % to 0.5 wt %, such as 0.003 wt % to 0.2 wt %, based upon the total weight of the composition. In at least one embodiment, 500 ppm or less of diene is added to the polymerization, such as 400 ppm or less, such as 300 ppm or less. In other embodiments, at least 50 ppm of diene is added to the polymerization, or 100 ppm or more, or 150 ppm or more.

Diolefin monomers include any suitable hydrocarbon structure, such as $C_4$ to $C_{30}$, having at least two unsaturated bonds, where at least two of the unsaturated bonds are readily incorporated into a polymer by either a stereospecific or a non-stereospecific catalyst(s). The diolefin monomers can be selected from alpha, omega-diene monomers (i.e., di-vinyl monomers). The diolefin monomers can be linear di-vinyl monomers, such as those containing from 4 to 30 carbon atoms. Dienes can include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, for example dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Cyclic dienes can include cyclopentadiene, vinylnorbornene, norbornadiene, ethylidene norbornene, divinylbenzene, dicyclopentadiene or higher ring containing diolefins with or without substituents at various ring positions.

Polymerization processes of the present disclosure can be carried out in any suitable manner. Any suitable suspension, homogeneous, bulk, solution, slurry, or gas phase polymerization process can be used. Such processes can be run in a batch, semi-batch, or continuous mode. Homogeneous polymerization processes and slurry processes can be used. (A homogeneous polymerization process is a process where at least 90 wt % of the product is soluble in the reaction media.) A bulk homogeneous process can be used. (A bulk process is a process where monomer concentration in all feeds to the reactor is 70 volume % or more.) Alternately, no solvent or diluent is present or added in the reaction medium, (except for the small amounts used as the carrier for the catalyst system or other additives, or amounts found with the monomer; e.g., propane in propylene). In another embodiment, the process is a slurry process. As used herein, the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_4$-10 alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In at least one embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, such as aromatics are present in the solvent at less than 1 wt %, such as less than 0.5 wt %, such as less than 0 wt % based upon the weight of the solvents.

In at least one embodiment, the feed concentration of the monomers and comonomers for the polymerization is 60 vol % solvent or less, such as 40 vol % or less, such as 20 vol % or less, based on the total volume of the feedstream. In at least one embodiment, the polymerization is run in a bulk process.

Polymerizations can be run at any temperature and/or pressure suitable to obtain the desired ethylene polymers. Suitable temperatures and/or pressures include a temperature in the range of from about 0° C. to about 300° C., such as about 20° C. to about 200° C., such as about 35° C. to about 150° C., such as from about 40° C. to about 120° C., such as from about 60° C. to about 100° C.; and at a pressure in the range of from about 0.35 MPa to about 10 MPa, such as from about 0.45 MPa to about 6 MPa, such as from about 0.5 MPa to about 4 MPa, such as from about 0.55 MPa to about 3 MPa, such as from about 0.60 MPa to about 2 MPa, such as from about 0.65 MPa to about 1 MPa (such as from about 0.95 psig to about 145 psig).

In a suitable polymerization, the run time of the reaction is up to 300 minutes, such as from about 5 minutes to 250 minutes, such as from about 10 minutes to 120 minutes, such as from about 20 minutes to 90 minutes, such as from about 20 minutes to 45 minutes.

For purpose of the present disclosure, hydrogen can be present in the polymerization reactor at a partial pressure of from 0.001 psig to 50 psig (0.007 to 345 kPa), such as from 0.01 psig to 25 psig (0.07 kPa to 172 kPa), such as 0.1 psig to 10 psig (0.7 kPa to 70 kPa).

In at least one embodiment, the activity of the catalyst is at least 50 g/mmol/hour, such as from about 60 g/mmol/hour to about 800 g/mmol/hr, such as from about 80 g/mmol/hour to about 750 g/mmol/hr, such as from about 300 g/mmol/hour to about 700 g/mmol/hr, such as from about 450 g/mmol/hour to about 675 g/mmol/hr.

In at least one embodiment, the conversion of olefin monomer is at least 10%, based upon polymer yield and the weight of the monomer entering the reaction zone, such as 20% or more, such as 30% or more, such as 50% or more, such as 80% or more.

In at least one embodiment, little or no alumoxane is used in the process to produce the polymers. For example, alumoxane is present at zero mol %, alternately the alumoxane is present at a molar ratio of aluminum to transition metal less than 500:1, such as less than 300:1, such as less than 100:1, such as less than 1:1.

In at least one embodiment, little or no scavenger is used in the process to produce the ethylene polymer. For example, scavenger (such as tri alkyl aluminum) is present at zero mol %, alternately the scavenger is present at a molar ratio of scavenger metal to transition metal of less than 100:1, such as less than 50:1, such as less than 15:1, such as less than 10:1.

In at least one embodiment, the present disclosure provides a process for the production of an ethylene alpha-olefin copolymer comprising: polymerizing ethylene and at least one $C_3$-$C_{20}$ alpha-olefin by contacting the ethylene and the at least one $C_3$-$C_{20}$ alpha-olefin with a catalyst system described above in at least one solution polymerization reactor at a reactor pressure of from 2 MPa to 200 MPa and a reactor temperature of from 10° C. to 250° C. to form an ethylene alpha-olefin copolymer.

In at least one embodiment, a polymerization: 1) is conducted at temperatures of 0° C. to 300° C. (such as 25° C. to 150° C., such as 40° C. to 130° C., such as 60° C. to 115° C., such as 80° C. to 100° C.); 2) is conducted at a pressure of atmospheric pressure to 10 MPa (such as 0.35 to 10 MPa, such as from 0.45 to 6 MPa, such as from 0.5 to 4 MPa, such as from 0.65 to 1 MPa); 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; such as where aromatics are present in the solvent at less than 1 wt %, such as less than 0.5 wt %, such as at 0 wt % based upon the weight of the solvents), such as isohexane; 4) where the catalyst system used in the polymerization includes less than 0.5 mol %, such as 0 mol % alumoxane, alternately the alumoxane is present at a molar ratio of aluminum to transition metal less than 500:1, such as less than 300:1, such as less than 100:1, such as less than 1:1; or less than 2.0 equivalent of N,N-dimethylanilinium tetrakis(pentafluorophenyl)borate, such as less than 1.5 equivalents, such as 1.1 equivalents; 5) the polymerization occurs in one reaction zone; 6) the activity of the catalyst compound is at least 50 g/mmol/hour (such as from about 60 g/mmol/hour to about 800,000 g/mmol/hr, such as from about 80 g/mmol/hour to about 750,000 g/mmol/hr, such as from about 300 g/mmol/hour to about 700,000 g/mmol/hr, such as from about 450 g/mmol/hour to about 500,000 g/mmol/hr); 7) optionally scavengers (such as trialkyl aluminum compounds) are absent (e.g., present at zero mol %, alternately the scavenger is present at a molar ratio of scavenger metal to transition metal of less than 100:1, such as less than 50:1, such as less than 15:1, such as less than 10:1); and 8) optionally, hydrogen is present in the polymerization reactor at a partial pressure of 0.001 to 50 psig (0.007 to 345 kPa) (such as from 0.01 to 25 psig (0.07 to 172 kPa), such as 0.1 to 10 psig (0.7 to 70 kPa)). In at least one embodiment, the catalyst system used in the polymerization includes no more than one catalyst compound. A "reaction zone" also referred to as a "polymerization zone" is a vessel where polymerization takes place, for example, a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In at least one embodiment, the polymerization occurs in one reaction zone. Room temperature is 23° C. unless otherwise noted.

Other additives may also be used in the polymerization, such as one or more scavengers, promoters, modifiers, chain transfer agents (such as diethyl zinc), reducing agents, oxidizing agents, hydrogen, aluminum alkyls, or silanes.

Chain transfer agents include alkylalumoxanes, a compound represented by the formula $AlR_3$ or $ZnR_2$ (where each R is, independently, a $C_1$-$C_8$ aliphatic radical, such as methyl, ethyl, propyl, butyl, pentyl, hexyl, octyl or an isomer thereof), such as a combination thereof, such as diethyl zinc, methylalumoxane, trimethylaluminum, triisobutylaluminum, trioctylaluminum, or a combination thereof.

Polyolefin Products

The present disclosure relates to compositions of matter produced by the methods described herein.

In at least one embodiment, a process described herein produces $C_2$ to $C_{20}$ olefin homopolymers or copolymers, such as ethylene-octene, ethylene-propylene and/or propylene-alpha-olefin (such as $C_3$ to $C_{20}$) copolymers (such as propylene-hexene copolymers or propylene-octene copolymers) having low comonomer incorporation (such as $C_8$ wt %) and/or narrow molecular weight distribution (MWD). Polymers of the present disclosure having a low comonomer content can be used as viscosity modifiers, unlike polymers have high comonomer content.

In at least one embodiment, the process for the production of an ethylene alpha-olefin copolymer includes: polymerizing ethylene and at least one $C_3$-$C_{20}$ alpha-olefin by contacting the ethylene and the at least one $C_3$-$C_{20}$ alpha-olefin with a catalyst system as described above in at least one solution polymerization reactor at a reactor pressure of from 2 MPa to 200 MPa and a reactor temperature of from 10° C. to 250° C. to form an ethylene alpha-olefin copolymer.

In at least one embodiment, the copolymer is ethylene alpha-olefin copolymer with an Mw value of 100,000 g/mol or greater, 200,000 g/mol or greater, such as 400,000 g/mol or greater, 500,000 g/mol or greater.

In at least one embodiment, the copolymer is ethylene alpha-olefin copolymer with an Mw value about 100,000 g/mol to about 750,000 g/mol, such as from 110,000 g/mol to 725,000 g/mol, such as from 120,000 g/mol to 700,000 g/mol, such as from 130,000 g/mol to 675,000 g/mol, such as from 300,000 g/mol to 650,000 g/mol, such as from 500,000 g/mol to 625,000 g/mol.

In at least one embodiment, the copolymer is ethylene alpha-olefin copolymer with an Mn value about 75,000 g/mol to about 600,000 g/mol, such as from 80,000 g/mol to 550,000 g/mol, such as from 300,000 g/mol to 500,000 g/mol, such as from 300,000 g/mol to 450,000 g/mol or alternatively 80,000 g/mol to 140,000 g/mol.

In at least one embodiment, the copolymer is ethylene alpha-olefin copolymer with an Mw/Mn value of 5 or less, such as from 4 to 1, such as from 3 to 1, such as from 2 to 1.

In at least one embodiment, the ethylene alpha-olefin copolymer has a comonomer content of 3 wt % to 10 wt %, such as from 3.5 wt % to 9 wt %, such as from 4 wt % to 8 wt %, such as from 4.5 wt % to 7.5 wt %.

In at least one embodiment, the copolymer is ethylene alpha-olefin copolymer with a melt temperature (Tm) (as determined by Differential Scanning Calorimetry) of about 110° C. to about 135° C., such as of about 115° C. to about 128° C., such as of about 122° C. to about 127° C.

Differential Scanning Calorimetry. Melting Temperature, Tm, is measured by differential scanning calorimetry ("DSC") using a DSCQ200 unit. The sample is first equilibrated at 25° C. and subsequently heated to 220° C. using a heating rate of 10° C./min (first heat). The sample is held at 220° C. for 3 min. The sample is subsequently cooled down to −100° C. with a constant cooling rate of 10° C./min (first cool). The sample is equilibrated at −100° C. before being heated to 220° C. at a constant heating rate of 10° C./min (second heat). The exothermic peak of crystallization (first cool) is analyzed using the TA Universal Analysis software and the corresponding to 10° C./min cooling rate is determined. The endothermic peak of melting (second heat) is also analyzed using the TA Universal Analysis software and the peak melting temperature (Tm) corresponding to 10° C./min heating rate is determined.

For purposes of the claims, Mw, Mn, Mw/Mn, and modality, are determined by using a High Temperature Gel Permeation Chromatography (Tosoh Bioscience LLC), equipped with a differential refractive index detector (DRI). Three high temperature TSK gel columns (Tosoh GMHHR-H(30)HT2) are used. The nominal flow rate is 1.0 mL/min, and the nominal injection volume is 300 μL. The various transfer lines, columns, and dual flow differential refractometer (the DRI detector) are contained in an oven maintained at 160° C. Solvent for the experiment is prepared by dissolving 1.2 grams of butylated hydroxytoluene as an antioxidant in 4 liters of Aldrich reagent grade 1, 2, 4 trichlorobenzene (TCB). The TCB mixture is then filtered through a 0.1 μm Teflon filter. The TCB is then degassed with an online degasser before entering the GPC instrument. Polymer solutions are prepared by placing dry polymer in glass vials, adding the desired amount of TCB, then heating the mixture at 160° C. with continuous shaking for about 2 hours. All quantities are measured gravimetrically. The injection concentration is from 0.5 to 2.0 mg/mL, with lower concentrations being used for higher molecular weight samples. Flow rate in the apparatus is then increased to 1.0 mL/minute, and the DRI is allowed to stabilize for 2 hours before injecting the first sample. The molecular weight is determined by combining universal calibration relationship with the column calibration which is performed with a series of monodispersed polystyrene (PS) standards. The MW is calculated at each elution volume with the following equation:

$$\log M_X = \frac{\log(K_X/K_{PS})}{a_X+1} + \frac{a_{PS}+1}{a_X+1}\log M_{PS}$$

where the variables with subscript "X" stand for the test sample while those with subscript "PS" stand for PS. For polystyrene, $\alpha_{PS}=0.67$ and $K_{PS}=0.000175$.

The concentration, c, at each point in the chromatogram is calculated from the baseline-subtracted DRI signal, $I_{DRI}$, using the following equation:

$$c = K_{DRI}I_{DRI}/(dn/dc)$$

where $K_{DRI}$ is a constant determined by calibrating the DRI, and (dn/dc) is the refractive index increment for the system. Specifically, dn/dc=0.109 for both polyethylene and polypropylene.

The mass recovery is calculated from the ratio of the integrated area of the concentration chromatography over elution volume and the injection mass which is equal to the pre-determined concentration multiplied by injection loop volume.

In this method, $\alpha_{PS}=0.67$ and $K_{PS}=0.000175$ while a and K are for other materials as calculated and published in literature (Sun, T. et al. *Macromolecules* 2001, v.34, pg. 6812), except that for purposes of the present invention and claims thereto, $\alpha=0.695$ and K=0.000579 for linear ethylene polymers, $\alpha=0.705$ and K=0.0002288 for linear propylene polymers, $\alpha=0.695$ and K=0.000181 for linear butene polymers, $\alpha$ is 0.695 and K is 0.000579*(1−0.0087*w2b+0.000018*(w2b)^2) for ethylene-butene copolymer where w2b is a bulk weight percent of butene comonomer, $\alpha$ is 0.695 and K is 0.000579*(1-0.0075*w2b) for ethylene-hexene copolymer where w2b is a bulk weight percent of hexene comonomer, and $\alpha$ is 0.695 and K is 0.000579*(1−0.0077*w2b) for ethylene-octene copolymer where w2b is a bulk weight percent of octene comonomer. Concentrations are expressed in g/cm³, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. In particular, this provides the methyls per 1000 total carbons (CH3/1000TC) as a function of molecular weight. The short-chain branch (SCB) content per 1000TC (SCB/1000TC) is then computed as a function of molecular weight by applying a chain-end correction to the CH3/1000TC function, assuming each chain to be linear and terminated by a methyl group at each end. The weight % comonomer is then obtained from the following expression in which f is 0.3, 0.4, 0.6, 0.8, and so on for $C_3$, $C_4$, $C_6$, $C_8$, and so on comonomers, respectively.

$$w2 = f * SCB/1000TC.$$

The bulk composition of the polymer from the GPC-IR and GPC-4D analyses is obtained by considering the entire signals of the $CH_3$ and $CH_2$ channels between the integration limits of the concentration chromatogram. First, the following ratio is obtained $$\text{Bulk IR ratio} = \frac{\text{Area of } CH_3 \text{ signal within integration limits}}{\text{Area of } CH_2 \text{ signal within integration limits}}.$$

Then the same calibration of the $CH_3$ and $CH_2$ signal ratio, as mentioned previously in obtaining the CH3/1000TC as a function of molecular weight, is applied to obtain the bulk CH3/1000TC. A bulk methyl chain ends per 1000TC (bulk CH3end/1000TC) is obtained by weight-averaging the chain-end correction over the molecular-weight range. Then $$w2b = f * \text{bulk } CH3/1000TC$$

$$\text{bulk } SCB/1000TC = \text{bulk } CH3/1000TC - \text{bulk}\frac{CH3end}{1000TC}$$

and bulk SCB/1000TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle θ, c is the polymer concentration determined from the IR5 analysis, $A_2$ is the second virial coefficient, P(θ) is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and λ=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1-0.00126*w2) ml/mg and $A_2$=0.0015 where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the equation [η]=$\eta_s$/c, where c is concentration and is determined from the IR5 broadband channel output. The viscosity MW at each point is calculated as $M=K_{PS}M^{\alpha_{PS}+1}/[\eta]$, where $\alpha_{ps}$ is 0.67 and $K_{ps}$ is 0.000175.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits. The branching index $g'_{vis}$ is defined as $$g'_{vis} = \frac{[\eta]_{avg}}{KM_v^\alpha},$$

where $M_V$ is the viscosity-average molecular weight based on molecular weights determined by LS analysis and the K and α are for the reference linear polymer, which are, for purposes of the present disclosure, α=0.695 and K=0.000579 for linear ethylene polymers, α=0.705 and K=0.0002288 for linear propylene polymers, α=0.695 and K=0.000181 for linear butene polymers, α is 0.695 and K is 0.000579*(1−0.0087*w2b+0.000018*(w2b)^2) for ethylene-butene copolymer where w2b is a bulk weight percent of butene comonomer, α is 0.695 and K is 0.000579*(1−0.0075*w2b) for ethylene-hexene copolymer where w2b is a bulk weight percent of hexene comonomer, and α is 0.695 and K is 0.000579*(1−0.0077*w2b) for ethylene-octene copolymer where w2b is a bulk weight percent of octene comonomer. Concentrations are expressed in g/cm³, molecular weight is expressed in g/mol, and intrinsic viscosity (hence K in the Mark-Houwink equation) is expressed in dL/g unless otherwise noted. Calculation of the w2b values is as discussed above.

Experimental and analysis details not described above, including how the detectors are calibrated and how to calculate the composition dependence of Mark-Houwink parameters and the second-virial coefficient, are described by T. Sun, P. Brant, R. R. Chance, and W. W. Graessley (*Macromolecules,* 2001, v.34(19), pp. 6812-6820).

End Uses

Blends

In another embodiment, the polymer (such as the polyethylene or polypropylene) produced herein is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In at least one embodiment, the polymer (such as the polyethylene or polypropylene) is present in the above blends, at from 10 wt % to 99 wt %, based upon the weight of the polymers in the blend, such as 20 wt % to 95 wt %, such as at least 30 wt % to 90 wt %, such as at least 40 to 90 wt %, such as at least 50 wt % to 90 wt %, such as at least 60 to 90 wt %, such as at least 70 wt % to 90 wt %.

The blends described above may be produced by mixing the polymers of the present disclosure with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

Films

One or more of the foregoing polymers, such as the foregoing polyethylenes or blends thereof, may be used in a variety of end-use applications. Such applications include, for example, mono- or multi-layer blown, extruded, and/or shrink films. These films may be formed by any suitable extrusion or coextrusion technique, such as a blown bubble film processing technique, where the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxial orientation can be accomplished using cold drawing or hot drawing methods. Biaxial orientation can be accomplished using tenter frame equipment or a double bubble process and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. The films can be oriented in the Machine Direction (MD) at a ratio of up to 15, such as from 5 to 7, and in the Transverse Direction (TD) at a ratio of up to 15, such as from 7 to 9. However, in another embodiment, the film is oriented to the same extent in both the MD and TD directions.

The films may vary in thickness depending on the intended application; however, films of a thickness from 1 μm to 50 μm are usually suitable. Films intended for packaging are usually from 10 μm to 50 μm thick. The thickness of the sealing layer may be from 0.2 μm to 50 μm. There may be a sealing layer on both the inner and outer surfaces of the film or the sealing layer may be present on only the inner or the outer surface.

In another embodiment, one or more layers may be modified by corona treatment, electron beam irradiation, gamma irradiation, flame treatment, or microwave. In at least one embodiment, one or both of the surface layers is modified by corona treatment.

Aspects

In another embodiment, the present disclosure relates to:

Clause 1. A catalyst compound represented by Formula (I):

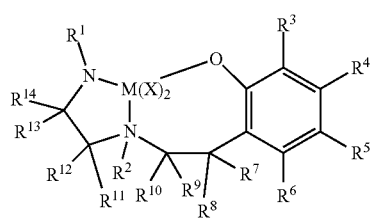

wherein:

M is a group 4 metal;

$R^1$ is an aromatic group or substituted aromatic group;

each of $R^2$, $R^3$, $R^4$, $R^5$, $R^6$, $R^7$, $R^8$, $R^9$, $R^{10}$, $R^{11}$, $R^{12}$, $R^{13}$, and $R^{14}$ is independently hydrogen, $C_1$-$C_{40}$ hydrocarbyl, $C_1$-$C_{40}$ substituted hydrocarbyl, a heteroatom or a heteroatom-containing group, or two or more of $R^1$, $R^2$, $R^3$, $R^4$, $R^5$, $R^6$, $R^7$, $R^8$, $R^9$, $R^{10}$, $R^{11}$, $R^{12}$, $R^{13}$, and $R^{14}$ are joined together to form a $C_4$-$C_{62}$ cyclic or polycyclic ring structure, or a combination thereof;

each X is independently $C_1$-$C_{20}$ hydrocarbyl, $C_1$-$C_{20}$ substituted hydrocarbyl, a heteroatom or a heteroatom-containing group, or two or more Xs join together to form a $C_4$-$C_{62}$ cyclic or polycyclic ring structure.

Clause 2. The catalyst compound of Clause 1, wherein $R^2$ is hydrogen or $C_1$-$C_{40}$ hydrocarbyl.

Clause 3. The catalyst compound of Clause 2, wherein $R^2$ $C_1$-$C_{10}$ hydrocarbyl.

Clause 4. The catalyst compound of Clause 2, wherein $R^2$ is hydrogen.

Clause 5. The catalyst compound of any of Clauses 1 to 4, wherein $R^1$ is represented by the structure:

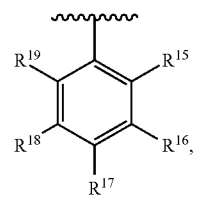

wherein each of $R^{15}$, $R^{16}$, $R^{17}$, $R^{18}$, and $R^{19}$ is independently selected from hydrogen, $C_1$-$C_{40}$ hydrocarbyl or $C_1$-$C_{40}$ substituted hydrocarbyl, a heteroatom or a heteroatom-containing group, or two or more of $R^{15}$, $R^{16}$, $R^{17}$, $R^{18}$, and $R^{19}$ are joined together to form a $C_4$-$C_{62}$ cyclic or polycyclic ring structure, or a combination thereof.

Clause 6. The catalyst compound of Clause 5, wherein each of $R^{15}$, $R^{16}$, $R^{17}$, $R^{18}$, and $R^{19}$ is independently selected from hydrogen and $C_1$-$C_{40}$ hydrocarbyl.

Clause 7. The catalyst compound of Clause 6, wherein each of $R^{15}$, $R^{16}$, $R^{17}$, $R^{18}$, and $R^{19}$ is hydrogen.

Clause 8. The catalyst compound of any of Clauses 1 to 6, wherein $R^{15}$ is isopropyl.

Clause 9. The catalyst compound of Clause 8, wherein $R^{19}$ is isopropyl.

Clause 10. The catalyst compound of any of Clauses 1 to 9, wherein $R^3$ is selected from phenyl, substituted phenyl, carbazole, substituted carbazole, naphthyl, substituted naphthyl, anthracenyl, substituted anthracenyl, fluorenyl, substituted fluorenyl, a heteroatom or a heteroatom-containing group.

Clause 11. The catalyst compound of Clause 10, wherein $R^3$ is phenyl, anthracenyl, naphthyl, fluorenyl, or carbazole.

Clause 12. The catalyst compound of any of Clauses 1 to 11, wherein each of $R^7$, $R^8$, $R^9$, $R^0$, $R^{11}$, $R^{12}$, $R^{13}$ and $R^{14}$ is independently selected from hydrogen and $C_1$-$C_{10}$ hydrocarbyl.

Clause 13. The catalyst compound of Clause 12, wherein each of $R^7$, $R^8$, $R^9$, $R^{10}$, $R^{11}$, $R^{12}$, $R^{13}$ and $R^{14}$ is hydrogen.

Clause 14. The catalyst compound of any of Clauses 1 to 13, wherein M is Zr or Hf Clause 15. The catalyst compound of any of Clauses 1 to 14, wherein each X is methyl, benzyl, or chloro.

Clause 16. The catalyst compound of Clause 1, wherein the catalyst compound is one or more of:
1
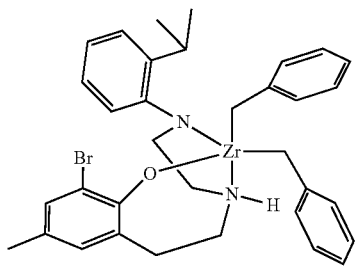
2
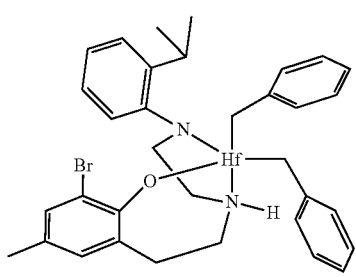
3
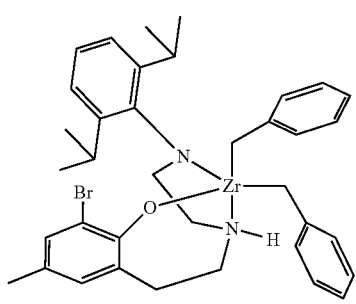
4
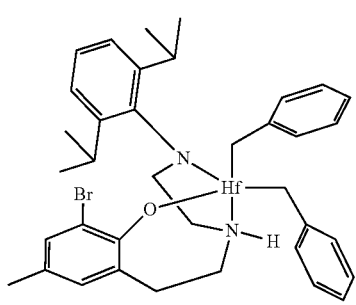
5
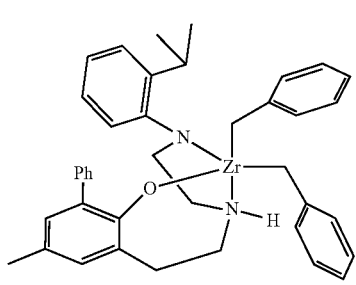
-continued
6
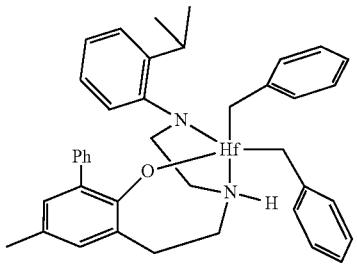
7
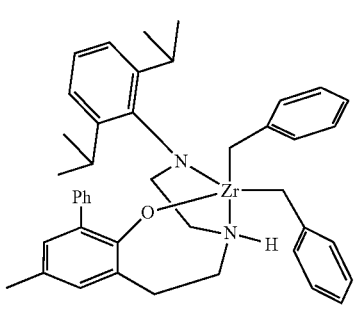
8
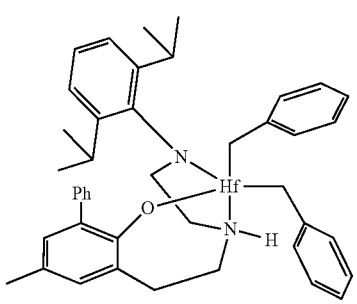
9
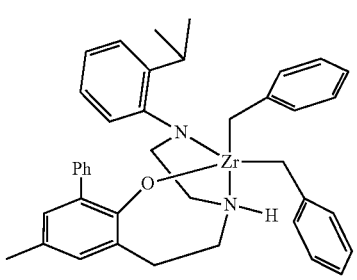
10
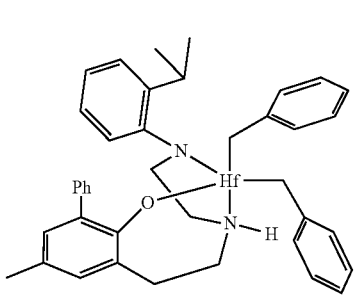

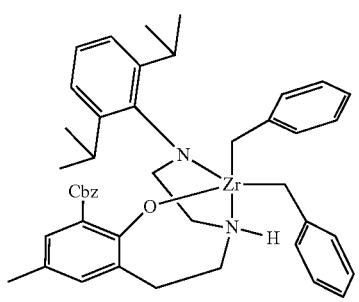
11
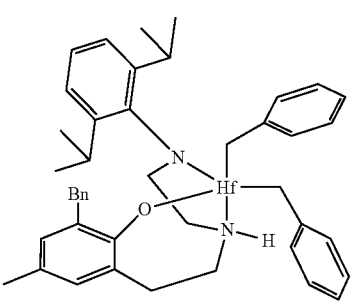
16
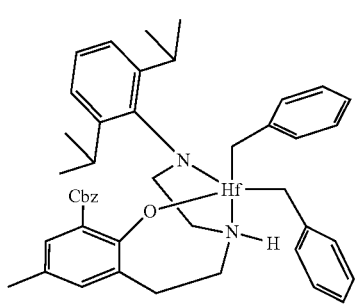
12
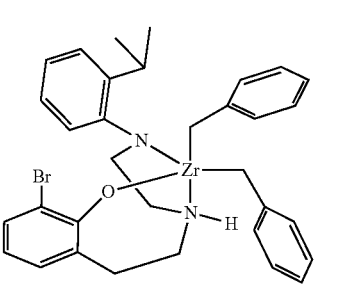
17
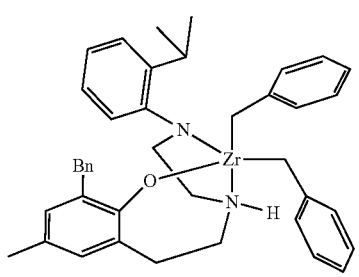
13
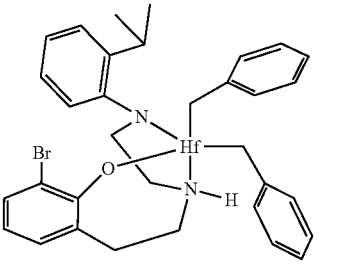
18
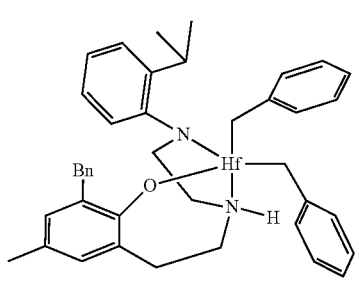
14
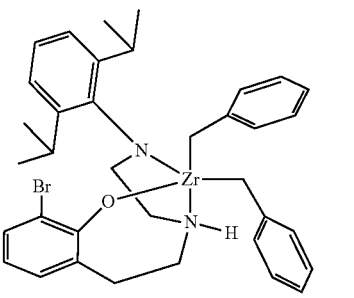
19
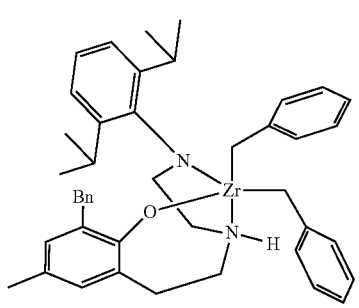
15
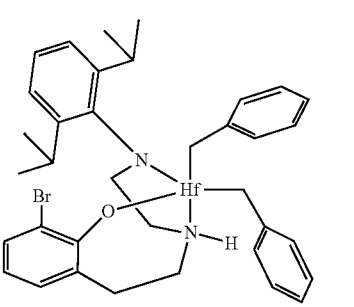
20

-continued
21
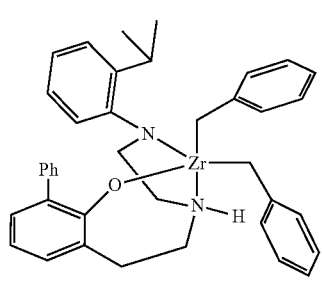
22
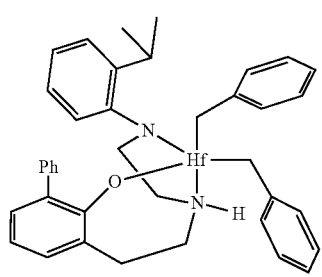
23
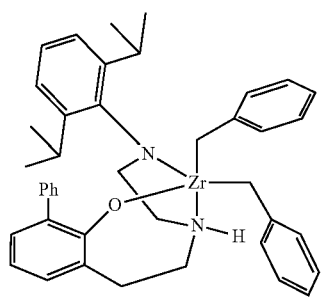
24
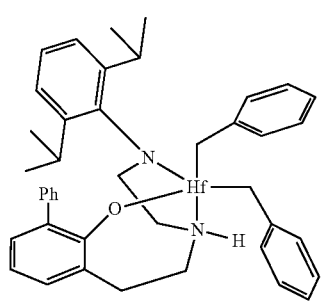
25
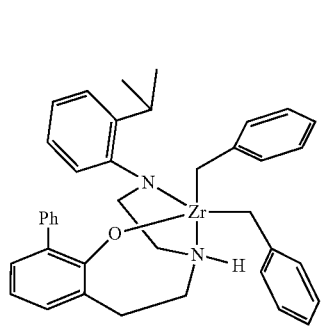
-continued
26
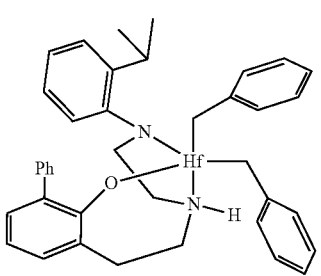
27
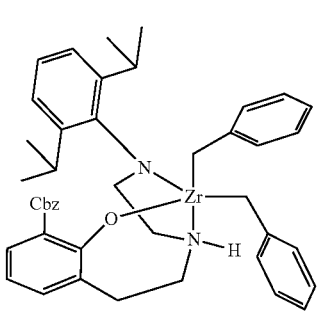
28
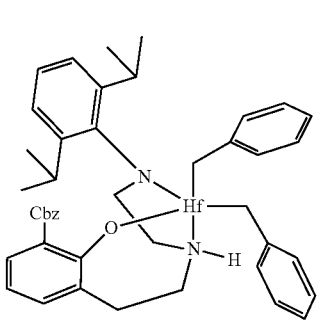
29
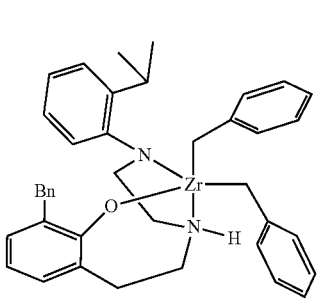
30
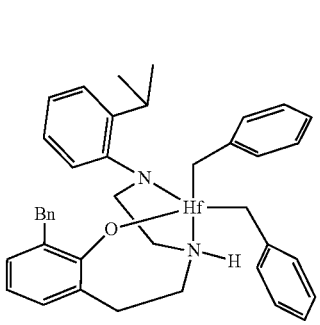

-continued

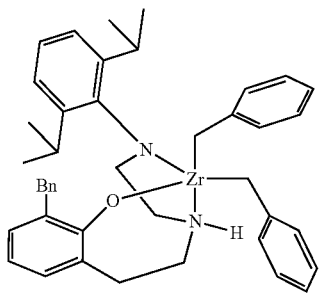

31

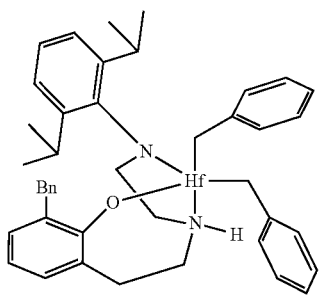

32

Clause 17. The catalyst compound of Clause 16, wherein the catalyst compound is one or more of:

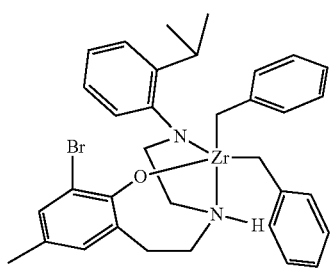

1

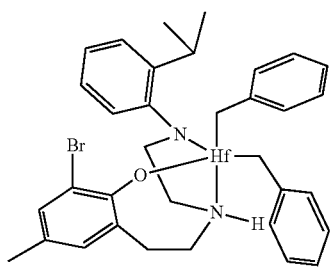

2

Clause 18. A catalyst system comprising an activator and the catalyst compound of any of Clauses 1 to 17.
Clause 19. The catalyst system of Clause 18, further comprising a support material.
Clause 20. The catalyst system of Clause 19, wherein the support material is selected from $Al_2O_3$, $ZrO_2$, $SiO_2$, $SiO_2/Al_2O_3$, $SiO_2/TiO_2$, silica clay, silicon oxide/clay, or mixtures thereof.
Clause 21. The catalyst system of any of Clauses 18 to 20, wherein the activator comprises an alkylalumoxane.
Clause 22. A process for the production of an ethylene alpha-olefin copolymer comprising: polymerizing ethylene and at least one $C_3$-$C_{20}$ alpha-olefin by contacting the ethylene and the at least one $C_3$-$C_{20}$ alpha-olefin with a catalyst system of Clauses 18 to 21 in the solution phase at a reactor pressure of from 2 MPa to 200 MPa and a reactor temperature of from 10° C. to 250° C. to form an ethylene alpha-olefin copolymer.
Clause 23. The process of Clause 22, wherein the ethylene alpha-olefin copolymer has an Mw value of 100,000 g/mol or greater.
Clause 24. The process of Clause 23, wherein the ethylene alpha-olefin copolymer has an Mw value of from 500,000 g/mol to 650,000 g/mol.
Clause 25. The process of Clause 24, wherein the ethylene alpha-olefin copolymer has an Mw/Mn value of from 1 to 2.5.
Clause 26. The process of any of Clauses 22 to 25, wherein the ethylene alpha-olefin copolymer has a comonomer content of from 4.5 wt % to 7.5 wt %.
Clause 27. The process of any of Clauses 22 to 26, wherein the ethylene alpha-olefin copolymer has a melt temperature of from 122° C. to 127° C.
Clause 28. The process of Clause 22 or 27, wherein the catalyst has a catalyst activity values of 90 gP/mmolCat·h$^{-1}$ or greater, and the ethylene alpha-olefin copolymer has a comonomer content of from about 4 wt % to 10 wt %, an Mn of 90,000 g/mol or greater, an Mw of from 155,000 g/mol to 625,000 g/mol, and an Mw/Mn of from 1 to 2.
Clause 29. The process of Clause 22 or 27, wherein the catalyst has a catalyst activity values of 90 gP/mmolCat·h$^{-1}$ or greater, and the ethylene alpha-olefin copolymer has a comonomer content of from about 4.5 wt % to about 7.5 wt %, an Mn of about 90,000 g/mol to about 420,000 g/mol, an Mw of from about 155,000 g/mol to about 625,000 g/mol, and an Mw/Mn of from 1 to 2.5.

This invention also relates to:
1. A catalyst compound represented by Formula (I):

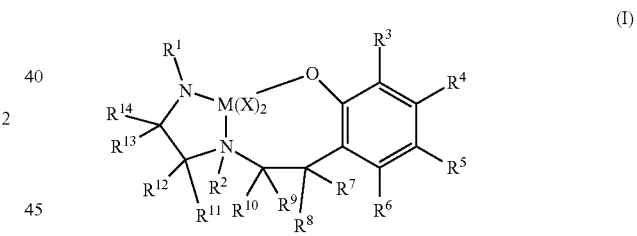

wherein:
M is a group 4 metal;
$R^1$ is an aromatic group or substituted aromatic group;
each of $R^2$, $R^3$, $R^4$, $R^5$, $R^6$, $R^7$, $R^8$, $R^9$, $R^{10}$, $R^{11}$, $R^{12}$, $R^{13}$, and $R^{14}$ is independently hydrogen, $C_1$-$C_{40}$ hydrocarbyl, $C_1$-$C_{40}$ substituted hydrocarbyl, a heteroatom or a heteroatom-containing group, or two or more of $R^1$, $R^2$, $R^3$, $R^4$, $R^5$, $R^6$, $R^7$, $R^8$, $R^9$, $R^{10}$, $R^{11}$, $R^{12}$, $R^{13}$, and $R^{14}$ are joined together to form a $C_4$-$C_{62}$ cyclic or polycyclic ring structure, or a combination thereof;
each X is independently $C_1$-$C_{20}$ hydrocarbyl, $C_1$-$C_{20}$ substituted hydrocarbyl, a heteroatom or a heteroatom-containing group, or two or more Xs join together to form a $C_4$-$C_{62}$ cyclic or polycyclic ring structure.
2. The catalyst compound of paragraph 1, wherein $R^2$ is hydrogen or $C_1$-$C_{40}$ hydrocarbyl.
3. The catalyst compound of paragraph 2, wherein $R^2$ $C_1$-$C_{10}$ hydrocarbyl.
4. The catalyst compound of paragraph 2, wherein $R^2$ is hydrogen.

5. The catalyst compound of any of paragraphs 1 to 4, wherein $R^1$ is represented by the structure:

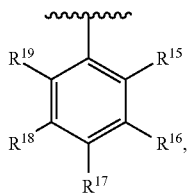

wherein each of $R^1$, $R^{16}$, $R^{17}$, $R^{18}$, and $R^{19}$ is independently selected from hydrogen, $C_1$-$C_{40}$ hydrocarbyl or $C_1$-$C_{40}$ substituted hydrocarbyl, a heteroatom or a heteroatom-containing group, or two or more of $R^{15}$, $R^{16}$, $R^{17}$, $R^{18}$, and $R^{19}$ are joined together to form a $C_4$-$C_{62}$ cyclic or polycyclic ring structure, or a combination thereof.

6. The catalyst compound of paragraph 5, wherein each of $R^{15}$, $R^{16}$, $R^{17}$, $R^{18}$, and $R^{19}$ is independently selected from hydrogen and $C_1$-$C_{40}$ hydrocarbyl.

7. The catalyst compound of paragraph 6, wherein each of $R^{15}$, $R^{16}$, $R^{17}$, $R^{18}$, and $R^{19}$ is hydrogen.

8. The catalyst compound of any of paragraphs 1 to 7 (preferably 1 to 4 or 6 to 7), wherein $R^{15}$ is isopropyl.

9. The catalyst compound of paragraph 8, wherein $R^{19}$ is isopropyl.

10. The catalyst compound of any of paragraphs 1 to 9 (preferably 1 to 4, 6 to 7, or 9), wherein $R^3$ is selected from phenyl, substituted phenyl, carbazole, substituted carbazole, naphthyl, substituted naphthyl, anthracenyl, substituted anthracenyl, fluorenyl, substituted fluorenyl, a heteroatom or a heteroatom-containing group.

11. The catalyst compound of paragraph 10, wherein $R^3$ is phenyl, anthracenyl, naphthyl, fluorenyl, or carbazole.

12. The catalyst compound of any of paragraphs 1 to 11 (preferably 1 to 4, 6 to 7, 9, or 11), wherein each of $R^7$, $R^8$, $R^9$, $R^{10}$, $R^{11}$, $R^{12}$, $R^{13}$ and $R^{14}$ is independently selected from hydrogen and $C_1$-$C_{10}$ hydrocarbyl.

13. The catalyst compound of paragraph 12, wherein each of $R^7$, $R^8$, $R^9$, $R^{10}$, $R^{11}$, $R^{12}$, $R^{13}$ and $R^{14}$ is hydrogen.

14. The catalyst compound of any of paragraphs 1 to 13 (preferably 1 to 4, 6 to 7, 9, 11, or 13), wherein M is Zr or Hf.

15. The catalyst compound of any of paragraphs 1 to 14 (preferably 1 to 4, 6 to 7, 9, 11, or 13), wherein each X is methyl, benzyl, or chloro.

16. The catalyst compound of paragraph 1, wherein the catalyst compound is one or more of compounds 1 to 32 as described above.

17. The catalyst compound of paragraph 16, wherein the catalyst compound is one or more of:

1

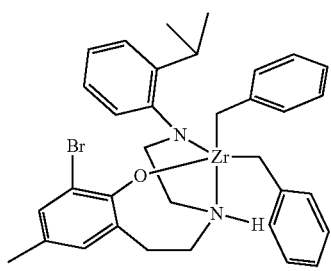

2

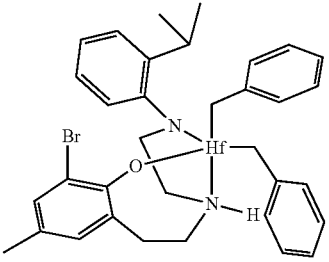

18. A catalyst system comprising an activator and the catalyst compound of any of paragraphs 1 to 17 (preferably 1 to 4, 6 to 7, 9, 11, 13, 16, or 17).

19. The catalyst system of paragraph 18, further comprising a support material.

20. The catalyst system of paragraph 19, wherein the support material is selected from $Al_2O_3$, $ZrO_2$, $SiO_2$, $SiO_2/Al_2O_3$, $SiO_2/TiO_2$, silica clay, silicon oxide/clay, or mixtures thereof.

21. The catalyst system of any of paragraphs 18 to 20, wherein the activator comprises an alkylalumoxane.

22. A process for the production of an ethylene alpha-olefin copolymer comprising: polymerizing ethylene and at least one $C_3$-$C_{20}$ alpha-olefin by contacting the ethylene and the at least one $C_3$-$C_{20}$ alpha-olefin with a catalyst system of any of paragraphs 18 to 21 in the solution phase at a reactor pressure of from 2 MPa to 200 MPa and a reactor temperature of from 10° C. to 250° C. to form an ethylene alpha-olefin copolymer.

23. The process of paragraph 22, wherein the ethylene alpha-olefin copolymer has an Mw value of 100,000 g/mol or greater.

24. The process of paragraph 23, wherein the ethylene alpha-olefin copolymer has an Mw value of from 500,000 g/mol to 650,000 g/mol.

25. The process of paragraph 24, wherein the ethylene alpha-olefin copolymer has an Mw/Mn value of from 1 to 2.5.

26. The process of paragraph 22, wherein the ethylene alpha-olefin copolymer has a comonomer content of from 4.5 wt % to 7.5 wt %.

27. The process of paragraph 22, wherein the ethylene alpha-olefin copolymer has a melt temperature of from 122° C. to 127° C.

28. The process of paragraph 22 or 27, wherein the catalyst has a catalyst activity values of 90 gP/mmolCat·h$^{-1}$ or greater, and the ethylene alpha-olefin copolymer has a comonomer content of from about 4 wt % to 10 wt %, an Mn of 90,000 g/mol or greater, an Mw of from 155,000 g/mol to 625,000 g/mol, and an Mw/Mn of from 1 to 2.

29. The process of paragraph 22 or 27, wherein the catalyst has a catalyst activity values of 90 gP/mmolCat·h$^{-1}$ or greater, and the ethylene alpha-olefin copolymer has a comonomer content of from about 4.5 wt % to about 7.5 wt %, an Mn of about 90,000 g/mol to about 420,000 g/mol, an Mw of from about 155,000 g/mol to about 625,000 g/mol, and an Mw/Mn of from 1 to 2.5.

EXPERIMENTAL EXAMPLES

Synthesis of the Catalysts
General Considerations:
All reagents were purchased from commercial vendors (Aldrich) and used as received unless otherwise noted.

Solvents were sparged with $N_2$ and dried over 3 Å molecular sieves. Tetrabenzyl hafnium and tetrabenzyl zirconium were purchased from Strem Chemicals. All chemical manipulations were performed in a nitrogen environment unless otherwise stated. Chromatography was carried out with a silica Biotage SNAP Ultra column using solvent systems specified. NMR spectra were recorded with chemical shifts referenced to residual solvent peaks.

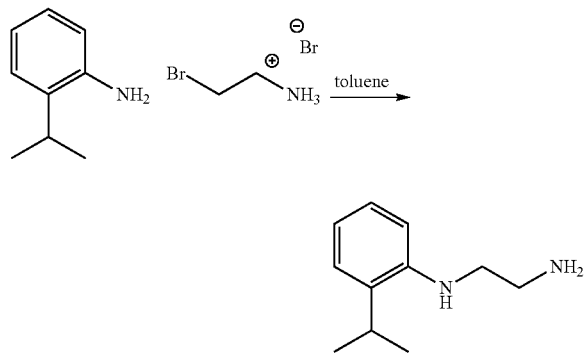

N'-(2-isopropylphenyl)ethane-1,2-diamine

A mixture of 2-Isopropylaniline (5.8 g, 44 mmol) and 2-bromoethylamine HBr (4.4 g, 22 mmol) were refluxed in toluene for 72 h. The reaction was cooled to ambient temperature. Water and 2M NaOH were added to dissolve the solid residues. The layers were separated and the aqueous portion extracted with toluene. The combined organic layers were washed with brine, dried over $MgSO_4$, filtered, and the filtrate concentrated to give the product. $^1H$ NMR (400 MHz, $C_6D_6$, δ): 1.19 (m, 6H), 2.50 (m, 2H), 2.79 (m, 2H), 2.57 (m, 1H), 6.65 (m, 1H), 6.57 (m, 1H), 7.20 (m, 2H).

N'-(3-bromo-2-(methoxymethoxy)-5-methylphenethyl)-$N^2$-(2-isopropylphenyl)ethane-1,2-diamine To a solution of the above diamine (140 mg, 0.78 mmol) and 2-(3-bromo-2-(methoxymethoxy)-5-methylphenyl)acetaldehyde (214 mg, 0.78 mmol) in 15 mL of methanol were added sodium cyanoborohydride (197 mg, 3 mmol) and acetic acid (37 mg, 6 mmol). The reaction was stirred at ambient temperature overnight. The mixture was concentrated onto a 3 g Biotage samplet and purified using a 5%-20% ethyl acetate/hexane solvent system, followed by a second purification with 0%-51% methanol/methylene chloride. $^1H$ NMR (400 MHz, $C_6D_6$, δ): 1.12 (d, J=8.0 Hz, 6H), 1.85 (s, 3H), 2.67 (m, 1H), 2.87 (m, 2H), 3.25 (m, 2H), 3.28 (s, 3H), 4.93 (s, 2H), 6.59 (s, 1H), 6.69 (m, 1H), 6.85 (m, 1H), 7.08 (s, 1H), 7.20 (m, 2H).

2-bromo-6-(2-((2-((2-isopropylphenyl)amino)ethyl)amino)ethyl)-4-methylphenol

The above protected phenol (54 mg, 124 mmol) was dissolved in THF. Hydrochloric acid (2 mL of 2.1 M) was added and the reaction stirred overnight at 50° C. The reaction was neutralized with sodium bicarbonate. Ethyl acetate was added and the organic solution washed with two portions of water, then dried over $MgSO_4$, filtered, and concentrated. The phenol was used in the next step without further purification.

Metallation:

In a nitrogen atmosphere, the ligand was dissolved in 4 mL of toluene in a 20 mL vial. Tetrabenzyl zirconium (or tetrabenzyl hafnium) was dissolved in 4 mL of toluene in a separate vial. The solutions were combined and after 1 hour, filtered through a 0.2 μm syringe filter, the toluene was removed, and the residue slurried in pentane.

The solids were collected and dried under vacuum.

General Polymerization Procedures for Parallel Pressure Reactor.

Solvents, polymerization-grade toluene, and isohexane were supplied by ExxonMobil Chemical Company and purified by passing through a series of columns: two 500 cc Oxyclear cylinders in series from Labclear (Oakland, Calif.), followed by two 500 cc columns in series packed with dried 3 Å mole sieves (8-12 mesh; Aldrich Chemical Company), and two 500 cc columns in series packed with dried 5 Å mole sieves (8-12 mesh; Aldrich Chemical Company).

1-octene ($C_8$) and 1-hexene ($C_6$) (98%, Aldrich Chemical Company) were dried by stirring over NaK overnight followed by filtration through basic alumina (Aldrich Chemical Company, Brockman Basic 1).

Polymerization-grade ethylene ($C_2$) was used and further purified by passing the gas through a series of columns: 500 cc Oxyclear cylinder from Labclear (Oakland, Calif.) followed by a 500 cc column packed with dried 3 Å mole sieves (8-12 mesh; Aldrich Chemical Company) and a 500 cc column packed with dried 5 Å mole sieves (8-12 mesh; Aldrich Chemical Company).

Polymerization grade propylene ($C_3$) was used and further purified by passing it through a series of columns: 2,250 cc Oxiclear cylinder from Labclear followed by a 2,250 cc column packed with 3 Å mole sieves (8-12 mesh; Aldrich Chemical Company), then two 500 cc columns in series packed with 5 Å mole sieves (8-12 mesh; Aldrich Chemical Company), then a 500 cc column packed with Selexsorb CD (BASF), and finally a 500 cc column packed with Selexsorb COS (BASF).

Solutions of the metal complexes and activators were prepared in a drybox using toluene (ExxonMobil Chemical Company; anhydrous, stored under nitrogen; 98%). Concentrations were typically 0.2 mmol/L for the metal complexes and N,N-dimethyl anilinium tetrakis-pentafluorophenyl borate (Activator 1) or 0.5% w/w for methyl alumoxane (MAO).

Polymerizations were carried out in a parallel, pressure reactor, as generally described in U.S. Pat. Nos. 6,306,658; 6,455,316; 6,489,168; WO 2000/009255; and Murphy et al., J. Am. Chem. Soc., 2003, v.125, pp. 4306-4317, each of which is fully incorporated herein by reference. The experiments were conducted in an inert atmosphere ($N_2$) drybox using autoclaves equipped with an external heater for temperature control, glass inserts (internal volume of reactor=23.5 mL for $C_2$ and $C_2/C_8$; 22.5 mL for $C_3$ runs), septum inlets, regulated supply of nitrogen, ethylene and propylene, and equipped with disposable PEEK mechanical stirrers (800 RPM). The autoclaves were prepared by purging with dry nitrogen at 110° C. or 115° C. for 5 hours and then at 25° C. for 5 hours. Although the specific quantities, temperatures, solvents, reactants, reactant ratios, pressures, and other variables are frequently changed from one polymerization run to the next, the following describes a typical polymerization performed in a parallel, pressure reactor.

Catalyst systems dissolved in solution were used in the polymerization examples below, unless specified otherwise.

Ethylene Homopolymerization (HDPE) and Ethylene-Octene Copolymerization (EO).

A pre-weighed glass vial insert and disposable stirring paddle were fitted to each reaction vessel of the reactor, which contained 48 individual reaction vessels. The reactor was then closed and purged with ethylene. Each vessel was charged with enough solvent (typically isohexane) to bring the total reaction volume, including the subsequent additions, to the desired volume, typically 5 mL. 1-octene, if required, was injected into the reaction vessel and the reactor was heated to the set temperature and pressurized to the predetermined pressure of ethylene, while stirring at 800 rpm. The aluminum and/or zinc compound in toluene was then injected followed by addition of the activator solution (typically 1.0-1.2 molar equivalents of N,N-dimethyl anilinium tetrakis-pentafluorophenyl borate–Activator 1).

The catalyst solution (typically 0.020 μmol to 0.080 μmol of metal complex) was injected into the reaction vessel and the polymerization was allowed to proceed until a predetermined amount of ethylene (quench value typically 20 psi) had been used up by the reaction. Alternatively, the reaction may be allowed to proceed for a set amount of time (maximum reaction time typically 30 minutes). Ethylene was added continuously (through the use of computer controlled solenoid valves) to the autoclaves during polymerization to maintain reactor gauge pressure (+/−2 psig) and the reactor temperature was monitored and typically maintained within +/−1° C. The reaction was quenched by pressurizing the vessel with compressed air. After the reactor was vented and cooled, the glass vial insert containing the polymer product and solvent was removed from the pressure cell and the inert atmosphere glove box, and the volatile components were removed using a Genevac HT-12 centrifuge and Genevac VC3000D vacuum evaporator operating at elevated temperature and reduced pressure. The vial was then weighed to determine the yield of the polymer product. The resultant polymer was analyzed by Rapid GPC (see below) to determine the molecular weight, by FT-IR (see below) to determine percent octene incorporation, and by DSC (see below) to determine melting point (Tm).

For polymerizations using MAO as activator (typically 100 to 1,000 molar equivalents), the MAO solution was injected into the reaction vessel after the addition of 1-octene and prior to heating the vessel to the set temperature and pressurizing with ethylene. No additional aluminum reagent was used as scavenger during these runs.

Equivalence is determined based on the mole equivalents relative to the moles of the transition metal in the catalyst complex.

Polymer Characterization.

Polymer sample solutions were prepared by dissolving polymer in 1,2,4-trichlorobenzene (TCB, 99+% purity from Sigma-Aldrich) containing 2,6-di-tertbutyl-4-methylphenol (BHT, 99% from Aldrich) at 165° C. in a shaker oven for approximately 3 hours. The typical concentration of polymer in solution was between 0.1 to 0.9 mg/mL with a BHT concentration of 1.25 mg BHT/mL of TCB.

To determine various molecular weight related values by GPC, high temperature size exclusion chromatography was performed using an automated "Rapid GPC" system as generally described in U.S. Pat. Nos. 6,491,816; 6,491,823; 6,475,391; 6,461,515; 6,436,292; 6,406,632; 6,175,409; 6,454,947; 6,260,407; and 6,294,388; each of which is incorporated herein by reference. This apparatus has a 30 series of three 30 cm×7.5 mm linear columns, each containing PLgel 10 µm, Mix B. The GPC system was calibrated using polystyrene standards ranging from 580 g/mol-3,390,000 g/mol. The system was operated at an eluent flow rate of 2.0 mL/minutes and an oven temperature of 165° C. 1,2,4-trichlorobenzene was used as the eluent. The polymer samples were dissolved in 1,2,4-trichlorobenzene at a concentration of 0.28 mg/mL and 400 µL of a polymer solution was injected into the system. The concentration of the polymer in the eluent was monitored using an evaporative light scattering detector. The molecular weights presented are relative to linear polystyrene standards and are uncorrected, unless indicated otherwise.

Differential Scanning Calorimetry (DSC) measurements were performed on a TAQ100 instrument to determine the melting point (Tm) of the polymers. Samples were preannealed at 220° C. for 15 minutes and then allowed to cool to room temperature overnight. The samples were then heated to 220° C. at a rate of 100° C./min and then cooled at a rate of 50° C./min. Melting points were collected during the heating period.

The weight percent of ethylene incorporated in polymers was determined by rapid FTIR spectroscopy on a Bruker Equinox 55+IR in reflection mode. Samples were prepared in a thin film format by evaporative deposition techniques. FT-IR methods were calibrated using a set of samples with a range of known wt % ethylene content. For ethylene-1-octene copolymers, the wt % octene in the copolymer was determined via measurement of the methyl deformation band at about 1,375 cm$^{-1}$. The peak height of this band was normalized by the combination and overtone band at about 4,321 cm$^{-1}$, which corrects for path length differences.

The results obtained for the ethylene-octene polymerization using Catalyst 1 are illustrated in Table 2.

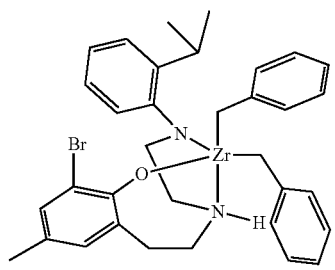

Cat. 1

Table 1 illustrates comparative results obtained for Catalyst 1 (with M=Zr). Catalyst 1 was found to be an active catalyst for olefin polymerization upon activation with N,N-dimethylanilinium tetrakis(pentafluorophenyl)borate and MAO, respectively. The polymerization process was performed using 0.08 µmol or 0.12 µmol of the catalyst with 1.1 equivalents of N,N-dimethylanilinium tetrakis(pentafluorophenyl)borate (in the presence of TNOAL as a scavenger) or 500 equivalents of MAO in isohexane, at either 80° C. and 95 psig, or 100° C. and 135 psig. Catalyst 1 demonstrated a low 1-octene incorporation providing polymers having a comonomer content of about 4.6 wt % to 7.2 wt %. When using MAO as the activator with Catalyst 1, high molecular weight polymers were obtained. 0.08 µmol Catalyst 1 at 14.8 psig uptake pressure and 80° C. (95 psi setpt pressure) provided the highest molecular weight polymer with an Mw of 625 Kg/mol and Mn of 418 Kg/mol and a catalyst activity of 450 gP/mmolCat/hr (Table 2, row 5), whereas Catalyst 1 used at 0.12 µmol with N,N-dimethylanilinium tetrakis(pentafluorophenyl)borate as the activator at 100° C. (135 psi set point pressure) (Table 2, row 4) provided the lowest molecular weight polymers having an Mw of 155 Kg/mol and Mn of 91 Kg/mol. All polymers obtained had a narrow PDI of 1.5 to 1.7.

TABLE 1

| Ethylene-Octene polymerization Conditions | |
| --- | --- |
| catalyst | 0.08-0.12 umol OMC4588 |
| activator | 1.1 eq N,N-dimethylanilinium tetrakis(pentafluorophenyl)borate or 500 eq MAO |
| 1-octene | 100 uL |
| volume of solution | 5 mL |
| solvent | Isohexane |

TABLE 2

Ethylene-Octene polymerization data with Catalyst 1

| Row | Catalyst (µmol) | Activator | Scavenger | Scavenger (µmol) | T (° C.) | P setpt (psi) | Uptake (psig) | Reaction time (s) |
| --- | --- | --- | --- | --- | --- | --- | --- | --- |
| 1 | 0.08 | N,N-dimethylanilinium tetrakis(pentafluorophenyl)borate | TNOAL | 0.5 | 80 | 95 | 2.3 | 1801 |
| 2 | 0.12 | N,N-dimethylanilinium tetrakis(pentafluorophenyl)borate | TNOAL | 0.5 | 80 | 95 | 12.5 | 1801 |
| 3 | 0.08 | N,N-dimethylanilinium tetrakis(pentafluorophenyl)borate | TNOAL | 0.5 | 100 | 135 | 2.7 | 1801 |
| 4 | 0.12 | N,N-dimethylanilinium tetrakis(pentafluorophenyl)borate | TNOAL | 0.5 | 100 | 135 | 12.1 | 1801 |
| 5 | 0.08 | MAO | | | 80 | 95 | 14.8 | 1801 |
| 6 | 0.08 | MAO | | | 80 | 95 | 7.9 | 1801 |
| 7 | 0.08 | MAO | | | 100 | 135 | 10.8 | 1800 |
| 8 | 0.08 | MAO | | | 100 | 135 | 13.4 | 1800 |

TABLE 2-continued

Ethylene-Octene polymerization data with Catalyst 1

| Row | Yield (g) | Activity (g/mmol/hr) | Mw (kg/mol) | Mn (kg/mol) | Mw/Mn | wt % C8= | Tm (° C.) |
|---|---|---|---|---|---|---|---|
| 1 | 0.005 | 125 | | | | | |
| 2 | 0.010 | 167 | 187 | 116 | 1.6 | 6.7 | 125.1 |
| 3 | 0.004 | 100 | | | | | |
| 4 | 0.020 | 333 | 155 | 91 | 1.7 | 5.4 | 125.3 |
| 5 | 0.018 | 450 | 625 | 418 | 1.5 | 4.8 | 124.0 |
| 6 | 0.021 | 525 | 594 | 345 | 1.7 | 4.8 | 124.5 |
| 7 | 0.027 | 675 | 509 | 306 | 1.7 | 7.2 | 123.8 |
| 8 | 0.024 | 600 | 522 | 343 | 1.5 | 4.6 | 126.0 |

Overall, catalysts, catalyst systems, and processes of the present disclosure can provide polyolefins at high catalyst activity values of 90 gP/mmolCat·h$^{-1}$ or greater, and polyolefins, such as polyethylene copolymers, having a comonomer content of from about 4 wt % to 10 wt %, an Mn of 90,000 g/mol or greater, an Mw of from 155,000 g/mol to 625,000 g/mol, and a narrow Mw/Mn of from 1 to 2. Catalysts, catalyst systems, and processes of the present disclosure can provide polymers having a comonomer content (e.g., comonomer content of from 4 wt % to 10 wt %, such as from 4.5 wt % to 7.5 wt %).

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the present disclosure, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including. Likewise whenever a composition, an element or a group of elements is preceded with the transitional phrase "comprising," it is understood that we also contemplate the same composition or group of elements with transitional phrases "consisting essentially of," "consisting of," "selected from the group consisting of," or "is" preceding the recitation of the composition, element, or elements and vice versa.

While the present disclosure has been described with respect to a number of embodiments and examples, those skilled in the art, having benefit of this disclosure, will appreciate that other embodiments can be devised which do not depart from the scope and spirit of the present disclosure.

What is claimed is:

1. A catalyst compound represented by Formula 4):

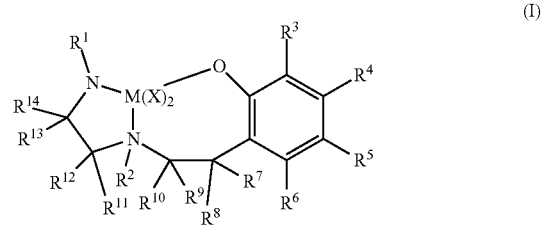

(I)

wherein:
M is a group 4 metal;
$R^1$ is an aromatic group or substituted aromatic group;
each of $R^2$, $R^3$, $R^4$, $R^5$, $R^6$, $R^7$, $R^8$, $R^9$, $R^{10}$, $R^{11}$, $R^{12}$, $R^{13}$, and $R^{14}$ is independently hydrogen, $C_1$-$C_{40}$ hydrocarbyl, $C_1$-$C_{40}$ substituted hydrocarbyl, a heteroatom or a heteroatom-containing group, or two or more of $R^1$, $R^2$, $R^3$, $R^4$, $R^5$, $R^6$, $R^7$, $R^8$, $R^9$, $R^{10}$, $R^{11}$, $R^{12}$, $R^{13}$, and $R^{14}$ are joined together to form a $C_4$-$C_{62}$ cyclic or polycyclic ring structure;
each X is independently $C_1$-$C_{20}$ hydrocarbyl, $C_1$-$C_{20}$ substituted hydrocarbyl, a heteroatom or a heteroatom-containing group, or two or more Xs join together to form a $C_4$-$C_{62}$ cyclic or polycyclic ring structure.

2. The catalyst compound of claim 1, wherein $R^2$ is hydrogen or $C_1$-$C_{40}$ hydrocarbyl.

3. The catalyst compound of claim 2, wherein $R^2$ $C_1$-$C_{10}$ hydrocarbyl.

4. The catalyst compound of claim 2, wherein $R^2$ is hydrogen.

5. The catalyst compound of claim 1, wherein $R^1$ is represented by the structure:

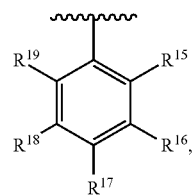

wherein each of $R^{15}$, $R^{16}$, $R^{17}$, $R^{18}$, and $R^{19}$ is independently selected from hydrogen, $C_1$-$C_{40}$ hydrocarbyl or $C_1$-$C_{40}$ substituted hydrocarbyl, a heteroatom or a heteroatom-containing group, or two or more of $R^{15}$, $R^{16}$, $R^{17}$, and $R^{19}$ are joined together to form a $C_4$-$C_{62}$ cyclic or polycyclic ring structure.

6. The catalyst compound of claim 5, wherein each of $R^{15}$, $R^{16}$, $R^{17}$, $R^{18}$, and $R^{19}$ is independently selected from hydrogen and $C_1$-$C_{40}$ hydrocarbyl.

7. The catalyst compound of claim 6, wherein each of $R^{15}$, $R^{16}$, $R^{17}$, $R^{18}$, and $R^{19}$ is hydrogen.

8. The catalyst compound of claim 5, wherein $R^{15}$ is isopropyl.

9. The catalyst compound of claim 8, wherein $R^{19}$ is isopropyl.

10. The catalyst compound of claim 1, wherein $R^3$ is selected from phenyl, substituted phenyl, carbazole, substituted carbazole, naphthyl, substituted naphthyl, anthracenyl, substituted anthracenyl, fluorenyl, substituted fluorenyl, a heteroatom or a heteroatom-containing group.

11. The catalyst compound of claim 10, wherein $R^3$ is phenyl, anthracenyl, naphthyl, fluorenyl, or carbazole.

12. The catalyst compound of claim 1, wherein each of $R^7$, $R^8$, $R^9$, $R^{10}$, $R^{11}$, $R^{12}$, $R^{13}$ and $R^{14}$ is independently selected from hydrogen and $C_1$-$C_{10}$ hydrocarbyl.

13. The catalyst compound of claim 12, wherein each of $R^7$, $R^8$, $R^9$, $R^{10}$, $R^{11}$, $R^{12}$, $R^{13}$ and $R^{14}$ is hydrogen.

14. The catalyst compound of claim 1, wherein M is Zr or Hf.

15. The catalyst compound of claim 14, wherein each X is methyl, benzyl, or chloro.

16. The catalyst compound of claim 1, wherein the catalyst compound is one or more of:

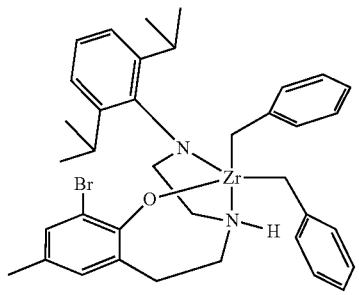

1

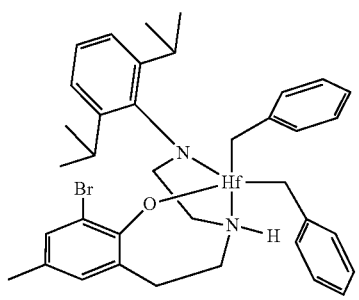

2

-continued

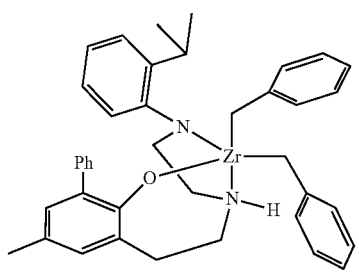

3

4

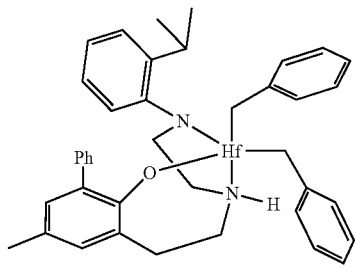

5

6

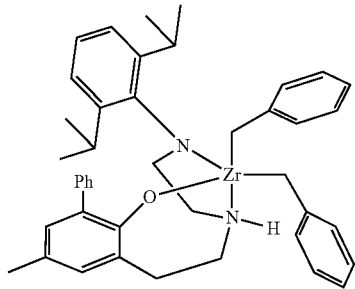

7

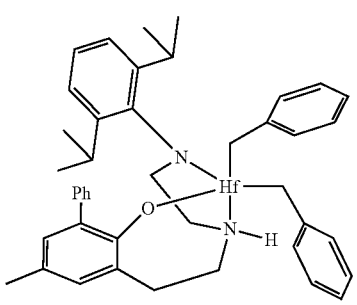
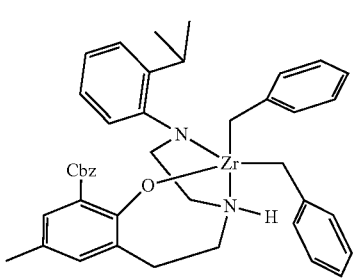
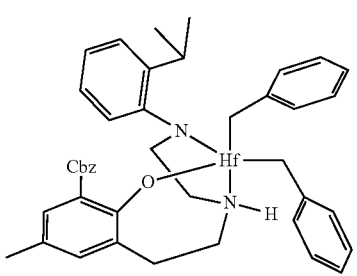
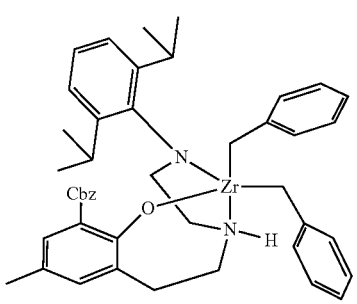
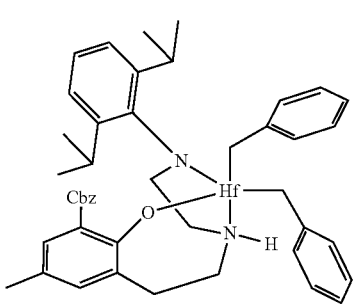
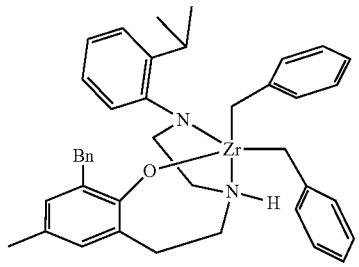
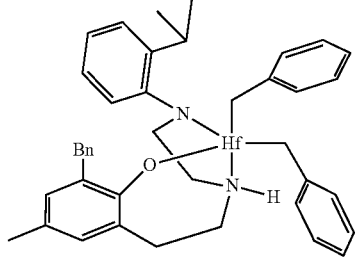
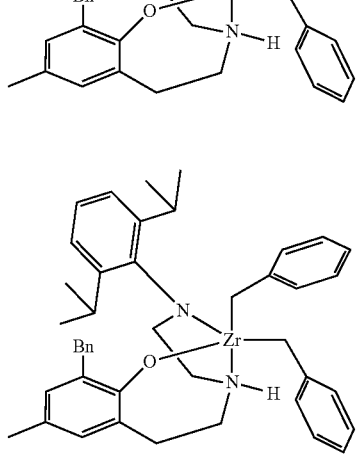
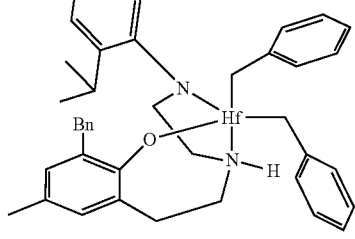
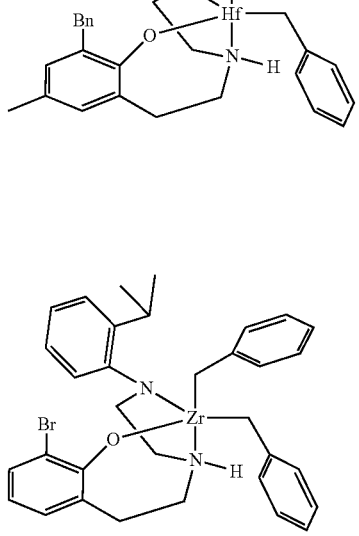

18
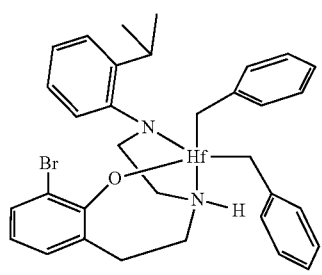
19
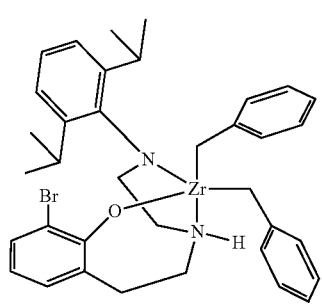
20
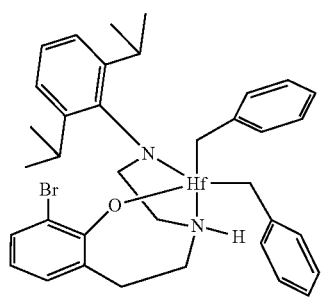
21
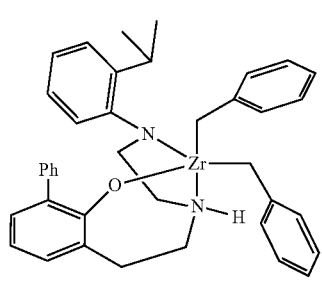
22
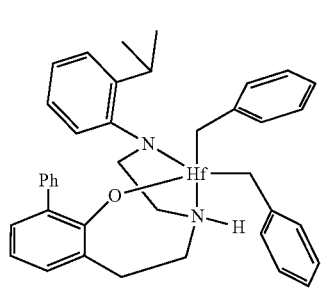
23
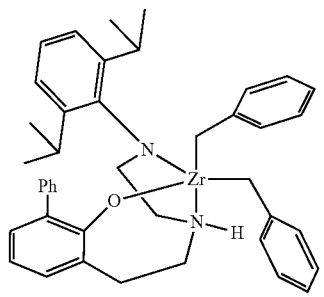
24
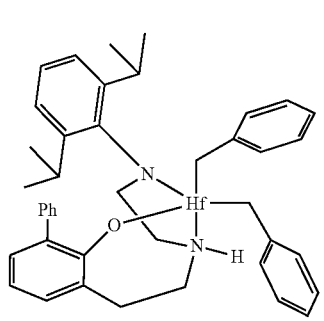
25
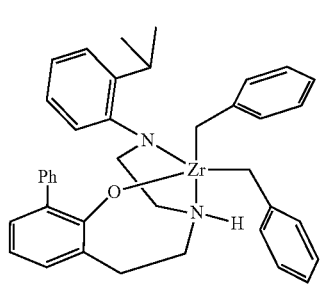
26
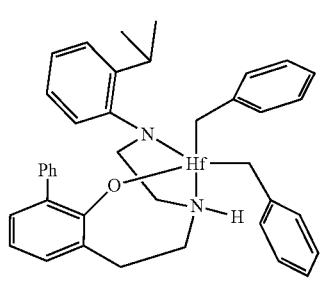
27
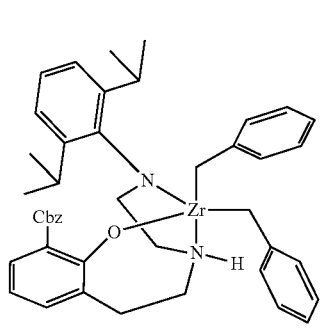

-continued

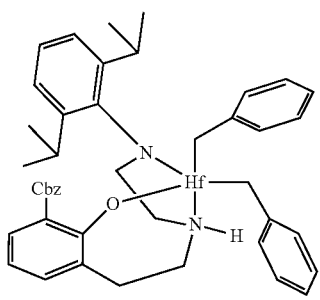

28

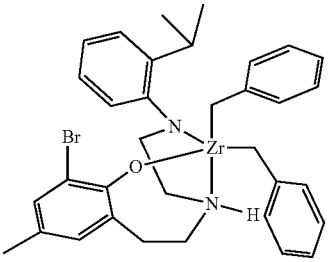

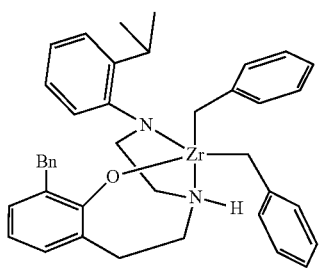

29

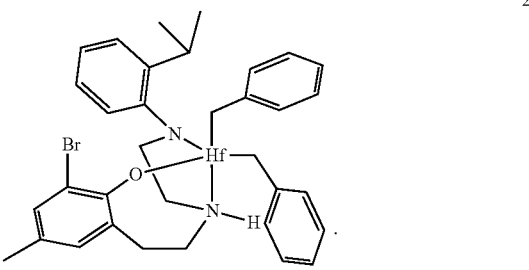

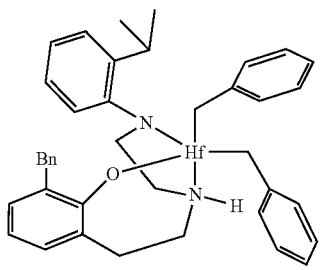

18. A catalyst system comprising an activator and the catalyst compound of claim 1.

19. The catalyst system of claim 18, further comprising a support material.

20. The catalyst system of claim 19, wherein the support material is selected from $Al_2O_3$, $ZrO_2$, $SiO_2$, $SiO_2/Al_2O_3$, $SiO_2/TiO_2$, silica clay, silicon oxide/clay, or mixtures thereof.

21. The catalyst system of claim 18, wherein the activator comprises an alkylalumoxane.

22. A process for the production of an ethylene alpha-olefin copolymer comprising:
  polymerizing ethylene and at least one $C_3$-$C_{20}$ alpha-olefin by contacting the ethylene and the at least one $C_3$-$C_{20}$ alpha-olefin with a catalyst system of claim 18 in the solution phase at a reactor pressure of from 2 MPa to 200 MPa and a reactor temperature of from 10° C. to 250° C. to form an ethylene alpha-olefin copolymer.

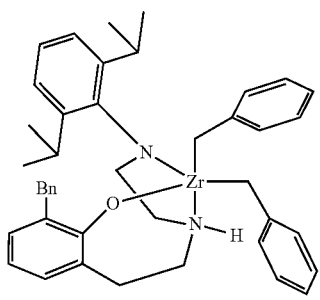

23. The process of claim 22, wherein the ethylene alpha-olefin copolymer has an Mw value of 100,000 g/mol or greater.

24. The process of claim 23, wherein the ethylene alpha-olefin copolymer has an Mw value of from 500,000 g/mol to 650,000 g/mol.

25. The process of claim 24, wherein the ethylene alpha-olefin copolymer has an Mw/Mn value of from 1 to 2.5.

26. The process of claim 22, wherein the ethylene alpha-olefin copolymer has a comonomer content of from 4.5 wt % to 7.5 wt %.

27. The process of claim 22, wherein the ethylene alpha-olefin copolymer has a melt temperature of from 122° C. to 127° C.

28. The process of claim 22, wherein the catalyst system has a catalyst activity value of 90 gP/mmolCat·h$^{-1}$ or greater, and the ethylene alpha-olefin copolymer has a comonomer content of from about 4 wt % to 10 wt %, a Mn of 90,000 g/mol or greater, a Mw of from 155,000 g/mol to 625,000 g/mol, and a Mw/Mn of from 1 to 2.

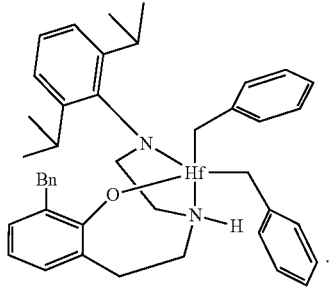

29. The process of claim 22, wherein the catalyst system has a catalyst activity value of 90 gP/mmolCat·h$^{-1}$ or greater, and the ethylene alpha-olefin copolymer has a comonomer content of from about 4.5 wt % to about 7.5 wt 17. The catalyst compound of claim 16, wherein the catalyst compound is one or more of:

%, a Mn of about 90,000 g/mol to about 420,000 g/mol, a Mw of from about 155,000 g/mol to about 625,000 g/mol, and a Mw/Mn of from 1 to 2.5.

\* \* \* \* \*